US010207669B2

(12) United States Patent
Konaka et al.

(10) Patent No.: US 10,207,669 B2
(45) Date of Patent: Feb. 19, 2019

(54) HEAD-PROTECTING AIRBAG DEVICE

(71) Applicant: TOYODA GOSEI CO., LTD., Kiyosu-shi, Aichi-ken (JP)

(72) Inventors: Hirotake Konaka, Kiyosu (JP); Ryosuke Jinnai, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 53 days.

(21) Appl. No.: 15/634,211

(22) Filed: Jun. 27, 2017

(65) Prior Publication Data
US 2018/0015901 A1    Jan. 18, 2018

(30) Foreign Application Priority Data

Jul. 13, 2016 (JP) ................................. 2016-138971

(51) Int. Cl.
*B60R 21/213* (2011.01)
*B60R 21/232* (2011.01)
*B60R 21/237* (2006.01)
*B60R 21/00* (2006.01)

(52) U.S. Cl.
CPC .......... *B60R 21/232* (2013.01); *B60R 21/213* (2013.01); *B60R 21/237* (2013.01); *B60R 2021/0048* (2013.01)

(58) Field of Classification Search
CPC ... B60R 21/213; B60R 21/232; B60R 21/237; B60R 2021/0048
See application file for complete search history.

(56) References Cited

U.S. PATENT DOCUMENTS

| 6,254,123 B1 * | 7/2001 | Urushi ................ B60R 21/213 280/730.2 |
| 7,097,200 B2 * | 8/2006 | Wold ................... B60R 21/213 280/730.2 |
| 7,168,735 B2 * | 1/2007 | Kino .................... B60R 21/213 280/730.2 |
| 7,273,227 B2 * | 9/2007 | Kawai .................. B60R 21/213 280/730.2 |
| 7,320,477 B2 * | 1/2008 | Kawabe ............... B60R 21/213 280/728.2 |

(Continued)

FOREIGN PATENT DOCUMENTS

JP    2011116154 A  *  6/2011
JP    2016-068634 A     5/2016

*Primary Examiner* — Laura Freedman
(74) *Attorney, Agent, or Firm* — Posz Law Group, PLC

(57) ABSTRACT

A case includes an opening at least at the lower region for receiving an airbag, and an engaging region engageable with a mounting bracket. The mounting bracket includes a mounting section which protrudes out of the case and a joint plate which is formed generally into a plate extending generally along an up and down direction and is disposed at a root region of the mounting section for engagement with the case. The engaging region of the case includes an insert slot which allows the joint plate to slide therein generally in an up and down direction, a retaining pawl which protrudes generally in an inboard-outboard direction and is inserted into a retaining hole of the joint plate and retains the joint plate, and an inboard side pressing surface and an outboard side pressing surface which press the joint plate retained by the retaining pawl on the inboard and outboard sides.

8 Claims, 17 Drawing Sheets

(56) References Cited

U.S. PATENT DOCUMENTS

| | | | | |
|---|---|---|---|---|
| 7,407,182 B2* | 8/2008 | Aoki | ............ | B60R 21/201 |
| | | | | 280/728.1 |
| 8,056,924 B2* | 11/2011 | Hatfield | ............ | B60R 21/201 |
| | | | | 280/728.2 |
| 10,005,419 B2* | 6/2018 | Konaka | ............ | B60R 21/213 |
| 2005/0046154 A1* | 3/2005 | Rhea | ............ | B60R 21/213 |
| | | | | 280/728.2 |
| 2015/0291119 A1* | 10/2015 | Noma | ............ | B60R 21/201 |
| | | | | 280/728.2 |

* cited by examiner

Sectional View at line A-A (A)

(B)

HEAD-PROTECTING AIRBAG DEVICE

CROSS REFERENCE TO RELATED APPLICATIONS

The Present application claims priority from Japanese Patent Application No. 2016-138971 of Konaka et al., filed on Jul. 13, 2016, the entire disclosure of which is incorporated herein by reference.

BACKGROUND OF THE INVENTION

1. Field of the Invention

The present invention relates to a head-protecting airbag device which includes an airbag which is mountable on the upper periphery of a window of a vehicle for deployment over the window, a mounting bracket which mounts the airbag on the inboard side of the vehicle body structure at the upper periphery of the window, and a case which is fabricated of synthetic resin for housing the airbag in a folded-up configuration.

2. Description of Related Art

JP2016-68634 discloses a known head-protecting airbag device which is provided with a mounting bracket for mounting an airbag on a vehicle body structure. The mounting bracket is coupled to the case in such a manner as to protrude out of the case, and secured to the vehicle body structure. As shown in FIGS. 6 and 7, the mounting bracket includes a mounting section to be secured to the vehicle body structure and a joint plate section which is disposed at a root region (or the lower end) of the mounting section and coupled with the case. In particular, the joint plate section is disposed generally along an up and down direction on the lower side of the mounting section. The case includes an inboard side pressing surface and an outboard side pressing surface which are disposed at different positions in a front and rear direction for pressing an inboard side surface and an outboard side surface of the joint plate section. This way the mounting bracket is prevented from moving in an inboard direction or outboard direction while being coupled with the case.

However, in the above conventional head-protecting airbag device, the coupling work of the mounting bracket and the case is complicated. Specifically, the case has an opening for receiving the mounting bracket only at the inboard side. Therefore, the mounting bracket needs to be inserted into the case through the opening in a lying posture, and then turned to upright posture and pushed in towards an outboard direction such that a lower end region of the jointing plate section overleaps the outboard side pressing surface of the case. Accordingly, it has been desired to provide a new technology that would facilitate the coupling work of the case and mounting bracket.

SUMMARY OF THE INVENTION

The present invention has an object to provide a head-protecting airbag device that has an easy coupling structure between a joint plate section of a mounting bracket and a case and is capable of keeping the mounting bracket in place with respect to the case.

The object of the invention will be attained by the following head-protecting airbag device:

The head-protecting airbag device of the invention is adapted to be mounted on an upper periphery of a window of a vehicle inside the vehicle and includes an airbag which is deployable over the window when actuated. The airbag is folded up in such a manner that a dimension between the upper edge and the lower edge of the airbag as deployed is reduced. The airbag device of the invention further includes a mounting bracket that is disposed at a vicinity of the upper edge of the airbag and used to mount the airbag on the upper periphery of the window of a body structure of the vehicle and a case which is fabricated from synthetic resin and houses the airbag in the folded-up configuration.

The case includes an opening for receiving the airbag at least at the lower region, and an engaging region engageable with the joint plate section of the mounting bracket.

The mounting bracket includes a mounting section to be secured to the body structure of the vehicle and a joint plate section which is disposed at a root region of the mounting section and jointed with the engaging region of the case. The joint plate section is formed generally into a plate extending generally along an up and down direction and includes a retaining hole. The mounting bracket as disposed on the airbag is coupled to the case such that the mounting section protrudes out of the case.

The engaging region of the case includes an insert slot which allows the joint plate section to slide therein generally in an up and down direction when the airbag is housed in the case, a retaining pawl which protrudes generally in an inboard-outboard direction to be inserted into the retaining hole of the joint plate section and retains the joint plate section and prevents the joint plate section from being dislocated in an up and down direction, and an inboard side pressing surface and an outboard side pressing surface which press the joint plate section on the inboard and outboard sides and prevent the joint plate section retained by the retaining pawl from being dislocated in an inboard-outboard direction.

With the configuration of the head-protecting airbag device of the invention, if, when the airbag in the folded-up configuration is housed inside the case, the joint plate section of the mounting bracket is inserted into the insert slot of the engaging region of the case and slid therein generally in an up and down direction, the retaining pawl of the engaging region is inserted into the retaining hole of the joint plate section and is retained by a periphery (specifically, by an inner surface) of the retaining hole. That is, in the head-protecting airbag device of the invention, the coupling work of the joint plate section of the mounting bracket and the engaging region of the case can be easily done merely by inserting the joint plate section into the insert slot of the engaging region and sliding it therein generally along an up and down direction, which will facilitate the storing of the airbag in the case, even if the airbag is elongated and has numerous mounting brackets.

Moreover, in the head-protecting airbag device of the invention, when the retaining pawl is in engagement with the retaining hole, the joint plate section is pressed, on the inboard side and outboard side, by the inboard side pressing surface and outboard side pressing surface of the engaging region of the case, thus limited from moving in the inboard-outboard direction. Additionally, since the retaining pawl is retained by the periphery (or the inner surface) of the retaining hole, the joint plate section is prevented from moving considerably in an up and down direction as well. That is, the mounting bracket is securely kept in place and prevented from being dislocated with respect to the case.

Therefore, with the head-protecting airbag device of the invention, the joint plate section of the mounting bracket is easily coupled with the case without a fear of dislocation of the mounting bracket with respect to the case thereafter.

In the above head-protecting airbag device of the invention, it is desired that:

the retaining pawl includes a neck region that is disposed generally along an up and down direction and a pawl body that protrudes out of the leading end of the neck region generally in an inboard-outboard direction and is inserted into the retaining hole and retains the joint plate section; and a surface of the neck region facing towards the joint plate section constitutes the inboard side pressing surface or the outboard side pressing surface.

With this configuration, when the joint plate section is slid through the insert slot, the neck region bends, and due to this bend, the pawl body presses the joint plate section towards the outboard side pressing surface or the outboard side pressing surface which is opposed to the pawl body. Accordingly, the joint plate section is moved in an up and down direction without a shakiness, in a stable fashion. Moreover, when the slide movement of the joint plate section is completed and the retaining hole reaches the position of the pawl body of the retaining pawl, the neck region restores to the original straight shape and presses the joint plate section with its surface facing towards the joint plate section, and the pawl body goes into the retaining hole automatically and retains the joint plate section. Therefore, the coupling work of the joint plate section with the engaging region of the case is easy.

In addition to the inboard side pressing surface or outboard side pressing surface composed of the surface of the neck region, the engaging region of the case desirably includes an additional inboard side pressing surface or outboard side pressing surface at a position distant from the retaining pawl in a front and rear direction and on the side the pawl body is protruding. With this configuration, when the joint plate section is moved inside the insert slot, even while the neck region is bent, the joint plate section is smoothly guided by the additional inboard side pressing surface or outboard side pressing surface and the first inboard side pressing surface or outboard side pressing surface which are opposed to the additional surface. Therefore, the joint plate section will be moved in an up and down direction without a shakiness, in a further stable fashion.

In the above head-protecting airbag device, it is further desired that:

the pawl body protrudes out of the lower end of the neck region towards an outboard direction;

the insert slot is configured to receive the joint plate section from the lower side such that the joint plate section is slid upward therein; and the engaging region further includes, on the outboard side of a region of the joint plate section disposed below the pawl body, an auxiliary holding surface which supplementarily holds the outboard side of the joint plate section.

This configuration will help keep the engagement between the retaining pawl and the joint plate section even if such a force that acts to disengage the pawl body of the retaining pawl from the periphery of the joint hole is applied to a vicinity of the pawl body before the airbag device is mounted on the vehicle. That is, the auxiliary holding surface will prevent the region of the joint plate section below the retaining hole from moving towards the outboard direction, and resist the force acting to disengage the retaining pawl from the joint plate section.

If, in the head-protecting airbag device of the invention, the engaging region further includes an upper stopper surface which abuts against an upper surface of the joint plate section and prevents the joint plate section from being dislocated upward, the joint plate section will be prevented from being dislocated upward with respect to the case.

If the engaging region further includes a pair of front-rear stopper surfaces which abut against the front surface and rear surface of the joint plate section and prevent the joint plate section from being dislocated in a front and rear direction, the joint plate section as coupled with the case will be kept from moving in a front and rear direction, in addition to in the inboard-outboard direction and the up and down direction. Therefore, the mounting bracket will be adequately kept in place with respect to the case.

The head-protecting airbag device of the invention is desirably configured such that the airbag includes a bag body and a joint tab which is formed into a loop out of a flexible material and protrudes upward out of an upper edge of the bag body for coupling with the mounting bracket, and that the joint tab is coupled with the mounting bracket by being inserted through the retaining hole of the mounting bracket.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
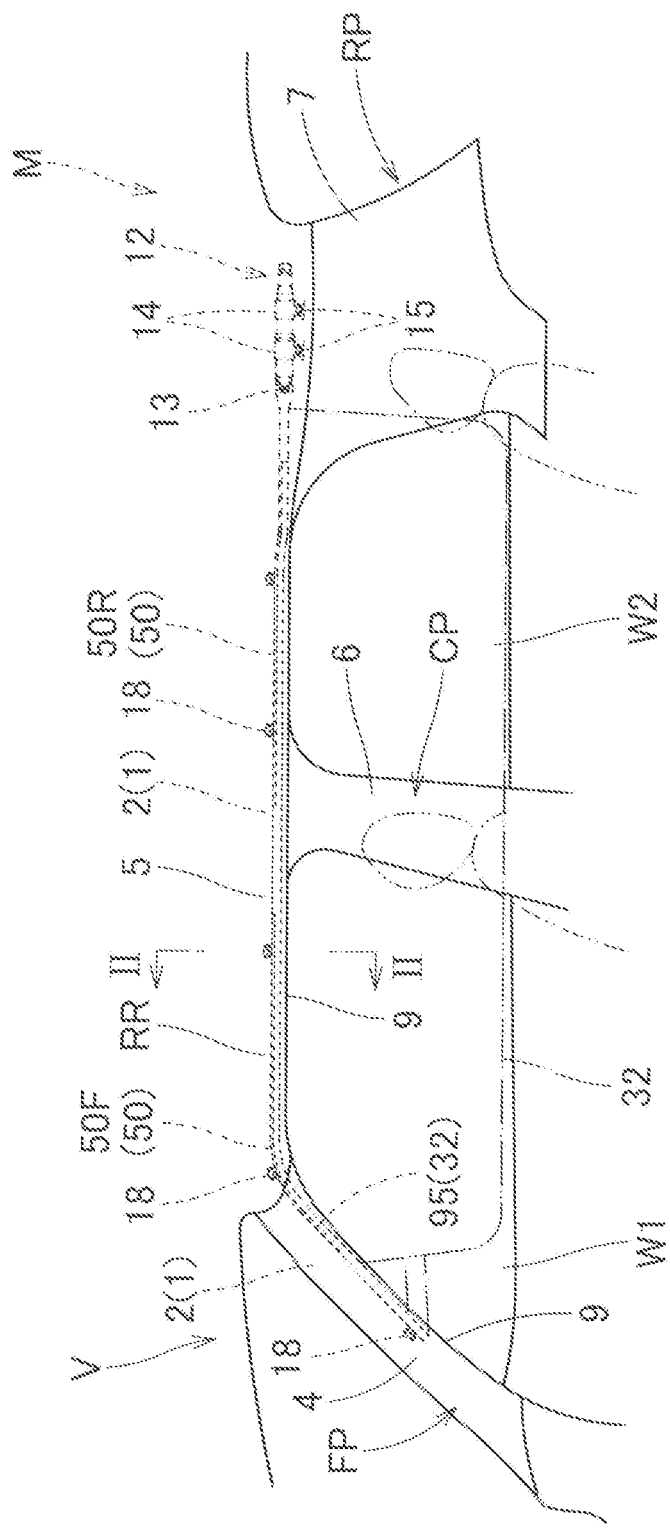
FIG. 1 is a schematic front elevation of a head-protecting airbag device embodying the invention as viewed from a vehicle interior.
Figure 2:
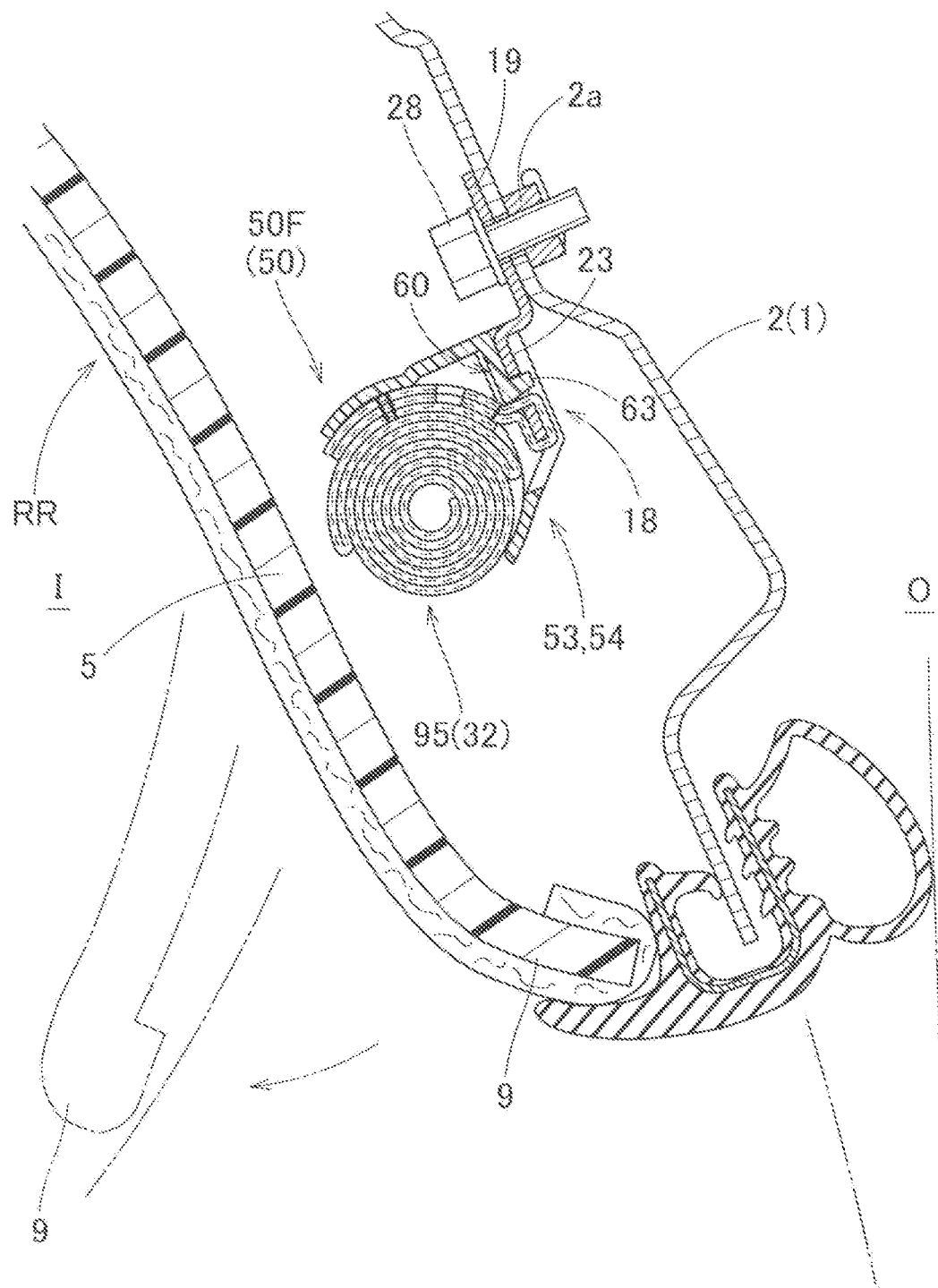
FIG. 2 is a sectional view taken along line II-II of FIG. 1.

As shown in FIG. 1, a head-protecting airbag device M embodying the present invention is mounted on a vehicle V with two rows of seats and two windows (side windows) W1 and W2. In the following description, unless otherwise specified, up-down and front-rear directions are intended to refer to the up-down and front-rear directions of the vehicle V on which the airbag device M is mounted. As shown in FIG. 1, the airbag device M includes an airbag 32, an inflator 12 for feeding the airbag 32 with an inflation gas, a mounting bracket 14 which is used to mount the inflator 12 on a vehicle body structure 1, a plurality of mounting brackets 18 used to mount the airbag 32 on the vehicle body structure 1, and a case 50 for housing the airbag 32 in a folded-up configuration (which will be hereinafter called a folded-up body 95). The airbag 32 is stored in the upper peripheries of the windows W1 and W2 in the interior of the vehicle V in a folded-up configuration, as shown in FIG. 1. More specifically, the airbag 32 is stored in a region ranging from a rear region of the front pillar FP to an upper region of the rear pillar RP, via the lower periphery of the roof-side rail RR. As mounted on the vehicle V, the airbag 32, the inflator 12 and the case 50 are covered with an airbag cover 9 on the inboard side, as shown in FIGS. 1 and 2. The airbag cover 9 of the illustrated embodiment is composed of a lower hem of a front pillar garnish 4, which covers the front pillar FP, and a lower hem of a roof head liner 5, which covers the roof side rail RR. The front pillar garnish 4 and roof head liner 5 are fabricated of synthetic resin, and are secured to an inboard side of an inner panel 2, a part of the vehicle body structure 1, at the front pillar FP and roof side rail RR. The airbag cover 9 is openable toward the interior of the vehicle V so as to allow the airbag 32 to deploy downward and inward.

As shown in FIG. 1, the inflator 12 is generally cylindrical in shape and is provided with not-shown gas discharge ports at the leading end region. The leading end region provided with the gas discharge ports is inserted into a later-described connection port 37 of the airbag 32, and the inflator 12 and the airbag 32 are clamped together through the use of a clamp 13 mounted around the connection port 37. As shown in FIG. 1, the inflator 12 is mounted on the inner panel 2 at a position above the rear pillar RP through the use of the mounting bracket 14, which holds the inflator 12, and mounting bolts 15 which fasten the mounting bracket 14 on the inner panel 2.

Figure 4:
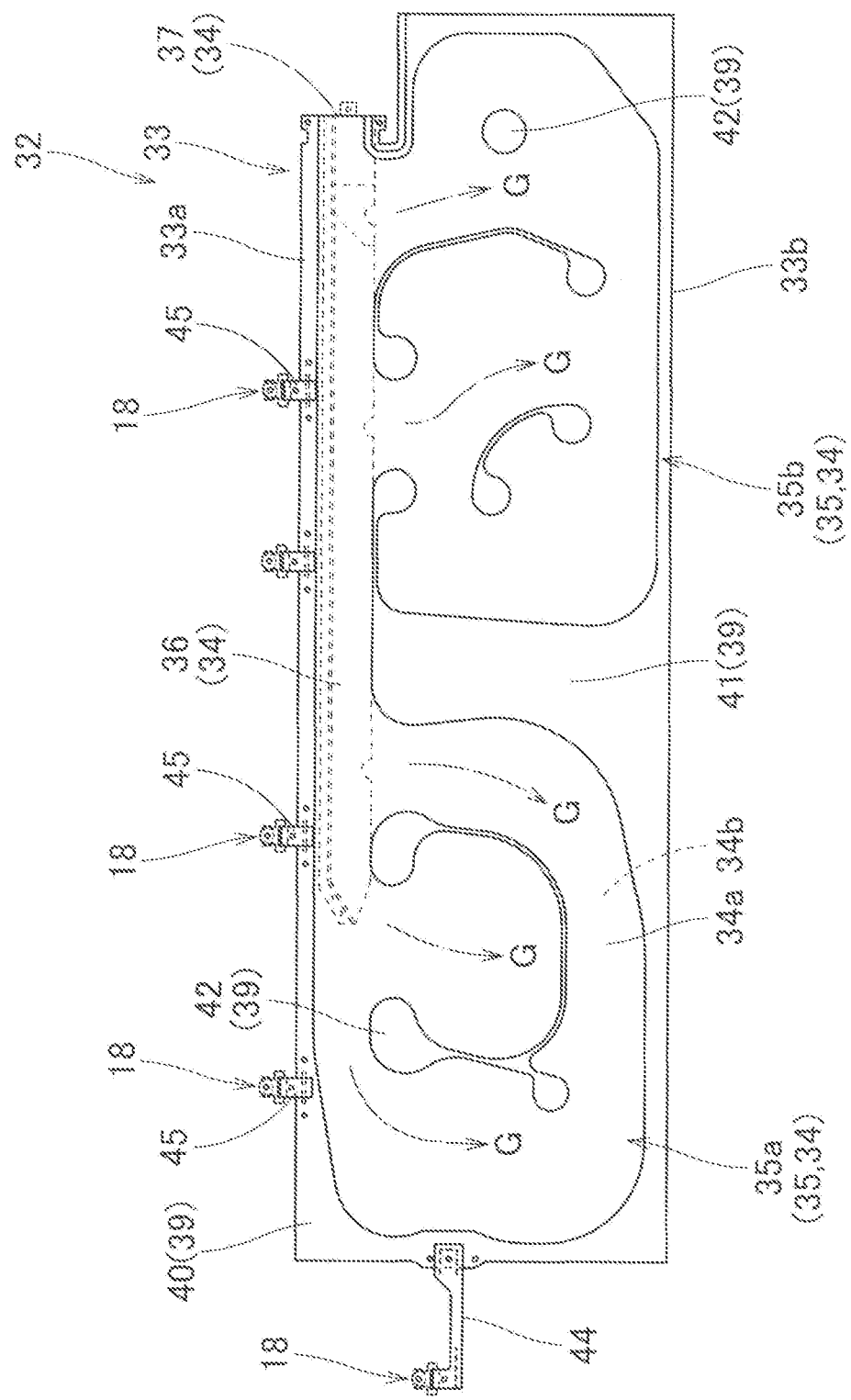
FIG. 4 is a front elevation of an airbag for use in the airbag device of FIG. 1 in a flattened state.
Figure 5:
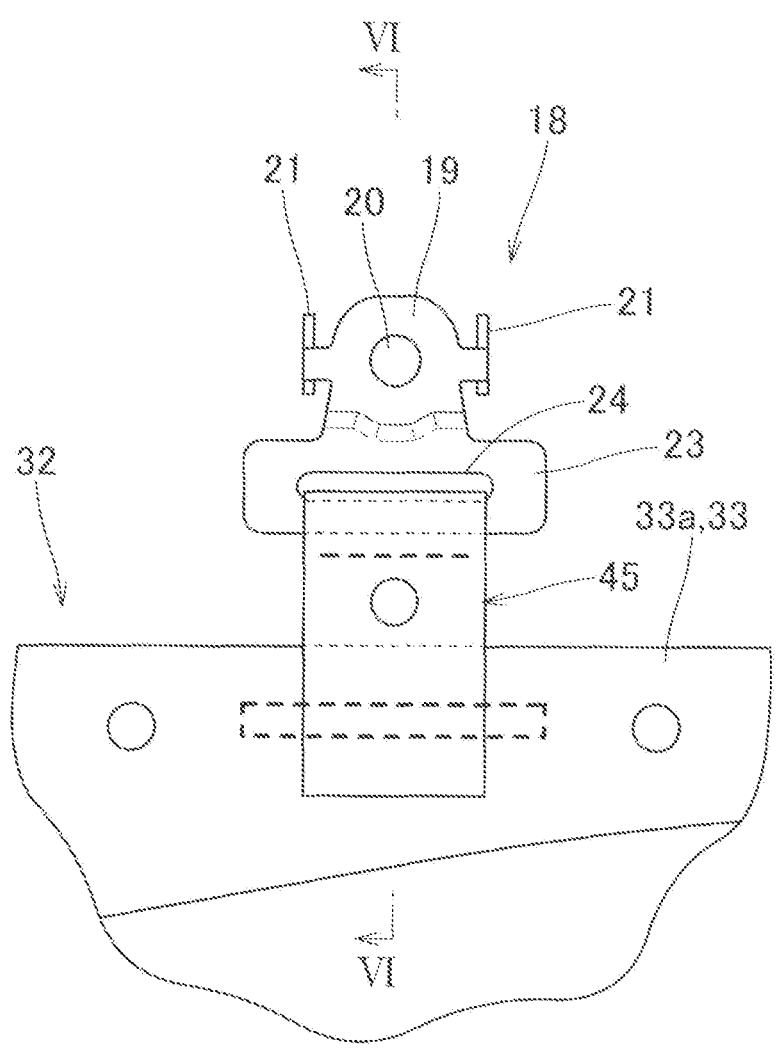
FIG. 5 is a partial enlarged front elevation of the airbag of FIG. 4 showing a joint tab coupled with the mounting bracket.
Figure 7:
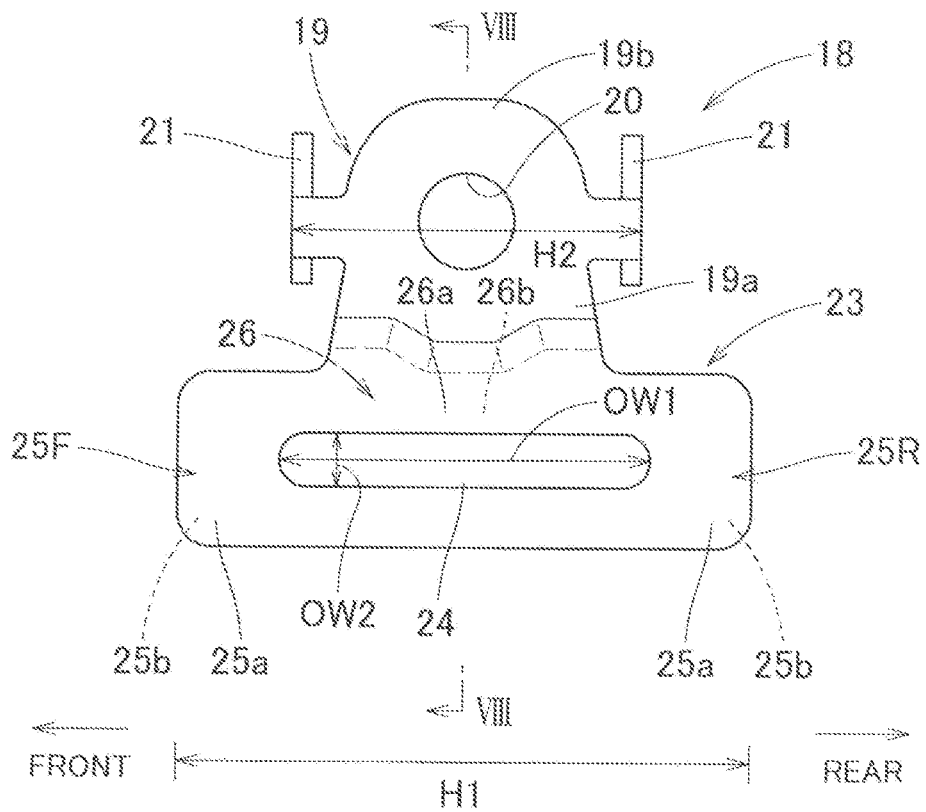
FIG. 7 is a front elevation of the mounting bracket.
Figure 8:
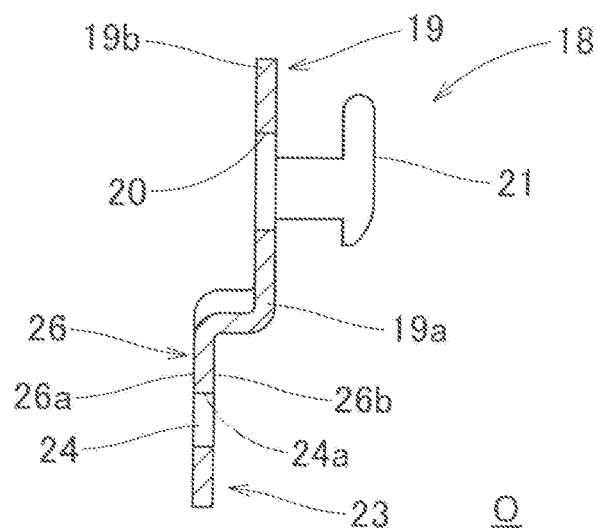
FIG. 8 is a sectional view taken along line VIII-VIII of FIG. 7.

As shown in FIGS. 2, 4 and 5, each of the mounting brackets 18 is used to mount the upper periphery 33a region of the airbag 32 (or a later-described bag body 33) on the vehicle body structure 1 at the upper peripheral region of the windows W1 and W2. As shown in FIGS. 7 and 8, each of the mounting brackets 18 is formed by bending a piece of sheet metal, and includes a mounting section 19 to be mounted on the vehicle body structure 1, and a joint plate section 23 which is disposed in a vicinity of a root region (i.e. the lower end 19a) of the mounting section 19 to be coupled with the case 50. The mounting bracket 18 has a generally symmetrical contour in a front and rear direction.

Figure 3:
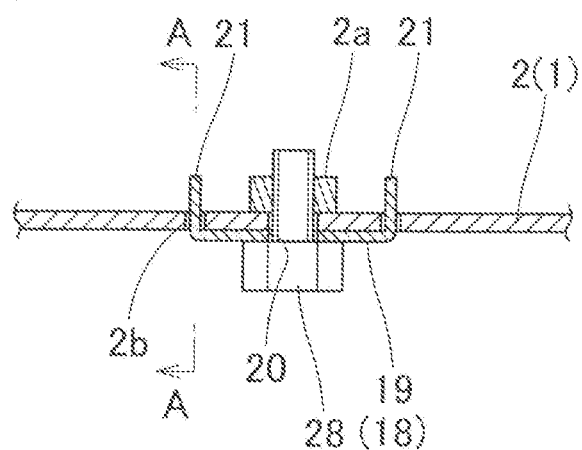
FIG. 3 is a partial enlarged horizontal section taken along a front and rear direction showing the way a mounting section of a mounting bracket is mounted on an inner panel, with a partial enlarged vertical section showing a retaining hook of the mounting section in a parenthesis.
Figure 3:
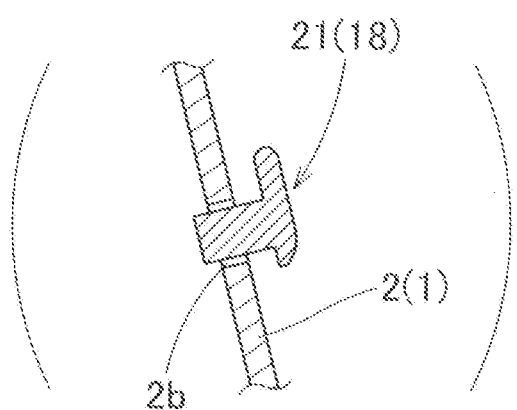

As shown in FIG. 2, the mounting section 19 to be mounted on the inner panel 2 of the vehicle body structure 1 is formed to extend generally along an up and down direction so as to fit to the inner panel 2. The mounting section 19 is provided with an insert hole 20 for receiving a bolt 28 as a fixing means. As shown in FIG. 3, the mounting section 19 is provided, at each of the front and rear edges, with a retaining hook 21 which protrudes towards the inner panel 2, i.e. towards an outboard direction O, and protrudes upward (FIGS. 5 to 8). The retaining hooks 21 are retained by peripheral regions of retaining holes 2b, which are formed on the inner panel 2, and serve as temporary fixer when the mounting section 19 is mounted on the inner panel 2.

The joint plate section 23 is disposed in a vicinity of the root region of the mounting section 19. The joint plate section 23 of the illustrated embodiment is formed to extend downward from a vicinity of the lower end 19a of the mounting section 19. More specifically, as viewed from a front and rear direction, the joint plate section 23 is formed in a stepped fashion with respect to the lower end 19a of the mounting section 19 and extends downward generally in parallel with the mounting section 19 at a position farther towards the interior of the vehicle V than the mounting section 19. That is, the joint plate section 23 extends generally along an up and down direction. The joint plate section 23 has a generally rectangular plate shape elongate in a front and rear direction, as shown in FIG. 7. The width H1 in a front and rear direction of the joint plate section 23 is greater than a width H2 in a front and rear direction of the mounting section 19. The joint plate section 23 includes, generally at the center, a joint hole 24 for receiving a later-described joint tab 45 of the airbag 32. The joint hole 24 has an elongate contour extending generally along a front and rear direction. In the illustrated embodiment, the joint hole 24 is disposed beneath the mounting section 19, and the opening width OW1 (FIG. 7) in a front and rear direction of the joint hole 24 is generally identical to the width H2 in a front and rear direction of the mounting section 19. Further, the opening width OW1 in a front and rear direction of the joint hole 24 is about two thirds of the width H1 in a front and rear direction of the joint plate section 23.

Figure 24:
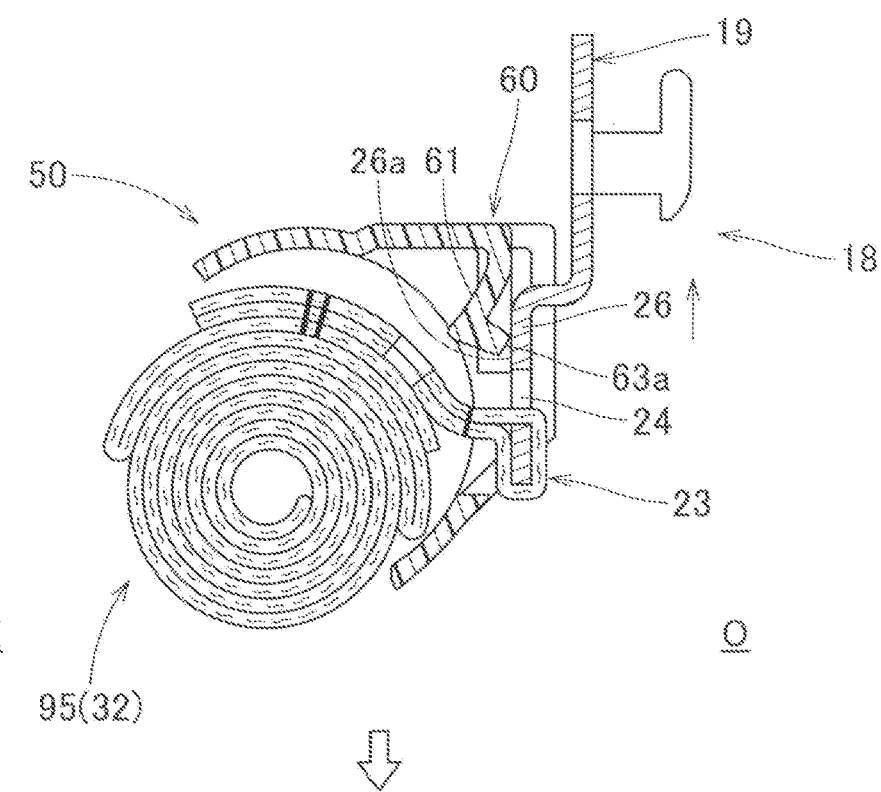
Figure 24:
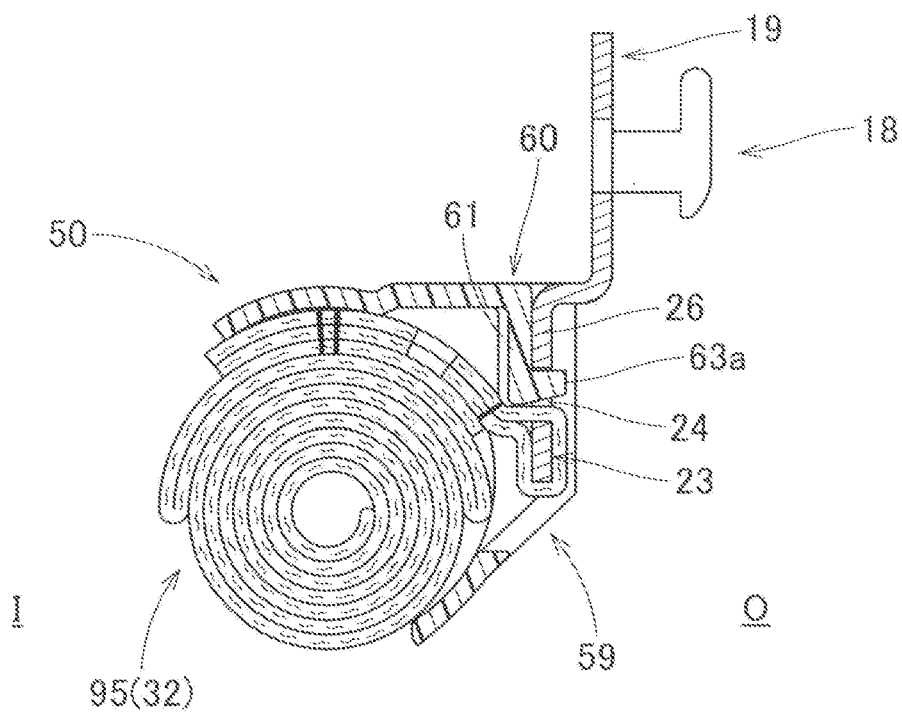

In the illustrated embodiment, the joint hole 24 also serves as a retaining hole for receiving and retaining a later-described pawl body 63 of a retaining pawl 60 formed in an engaging region 53 of the case 50. The opening width OW1 in a front and rear direction and the opening width OW2 in an up and down direction of the joint hole 24 (FIG. 7) is determined such that the joint hole 24 admits both the pawl body 63 and joint tab 45 and the pawl body 63 may be retained by the periphery (by the upper inner surface 24a, in the illustrated embodiment) of the joint hole 24, as shown in (B) of FIG. 24.

Figure 17:
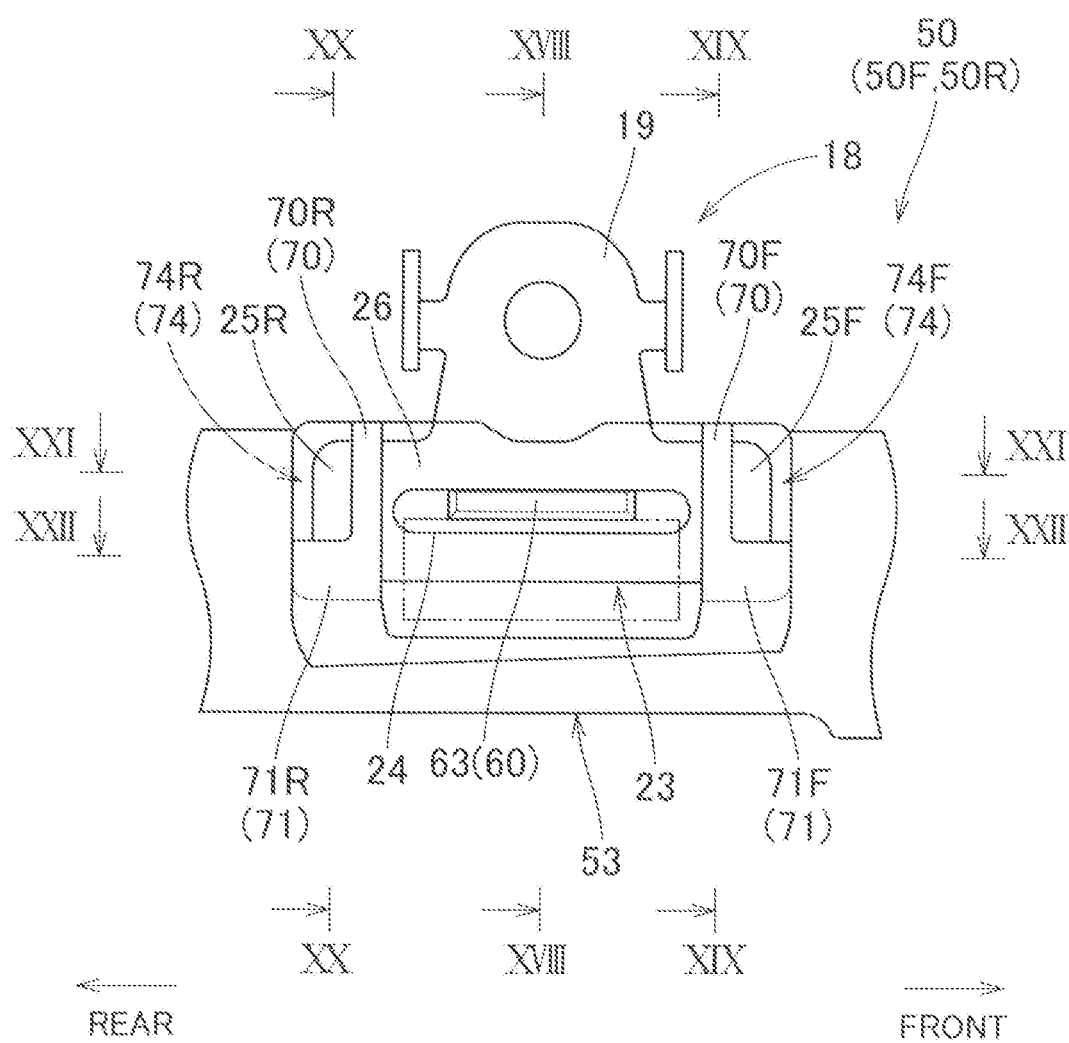
FIG. 17 is a partial enlarged rear view of the case of FIG. 9 to which the mounting bracket is coupled, as viewed from the outboard side.
Figure 18:
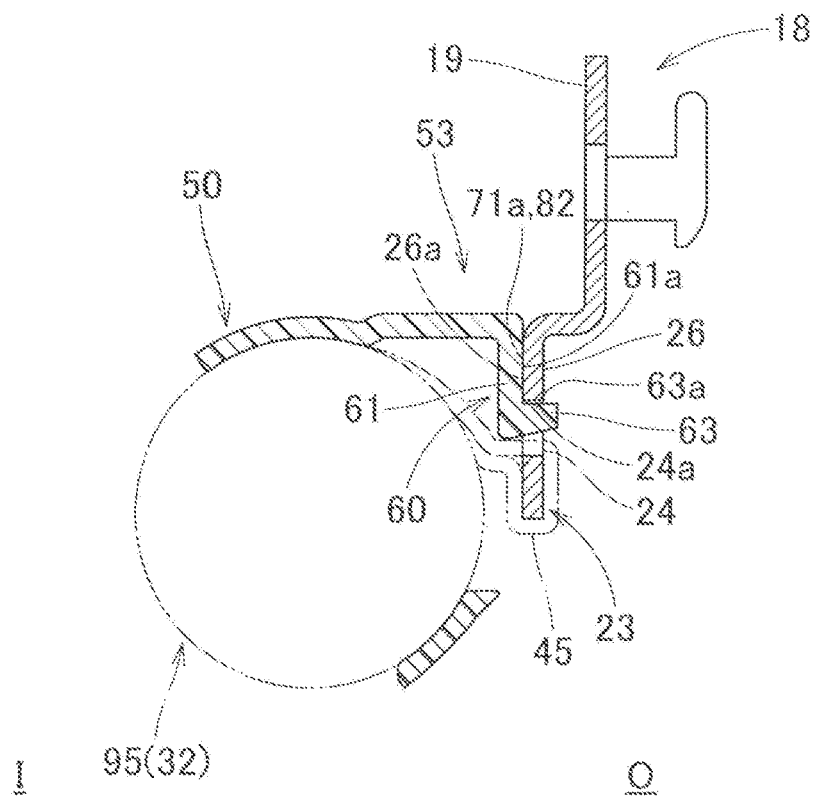
FIG. 18 is an end sectional view taken along line XVIII-XVIII of FIG. 17.

Areas in front of and at the rear of the joint hole 24 in the joint plate section 23 each serve as a front pressed region 25F and a rear pressed region 25R each of which is inserted through a later-described insert slot 80F/80R formed in the engaging region 53 of the case 50 and pressed on the inboard side and outboard side (FIGS. 17, 19, 20 to 22). An area above the joint hole 24 in the joint plate section 23 serves as an upper pressed region 26 which is pressed on the inboard side by a later-described outboard side surface 61a of a neck region 61 of the retaining pawl 60 (FIGS. 17 and 18).

Each of the mounting brackets 18 is coupled with each of the joint tabs 45 of the airbag 32, which, as described later, are formed in such a manner as to protrude out of the upper periphery 33a of the bag body 33 of the airbag 32. The joint tab 45 is inserted through the joint hole 24 of the joint plate section 23, thus coupled with the mounting bracket 18. Each of the mounting brackets 18 is then temporarily fixed at a predetermined position of the inner panel 2 with the aid of the retaining hooks 21 of the mounting section 19 retained by the peripheral regions of the retaining holes 2b of the inner panel 2. Then as shown in FIGS. 2 and 3, the bolt 28 (i.e., fixing means) is put through the insert hole 20 of the mounting section 19 of each of the mounting brackets 18 and fastened into a nut 2a which is fixed to the inner panel 2, in order to secure the mounting section 19 to the inner panel 2. Thus the upper periphery 33a region of the airbag 32 (or bag body 33) is mounted on the vehicle body structure 1 at the upper periphery of the windows W1 and W2.

As shown in FIG. 4, the airbag 32 includes a bag body 33 and a plurality of joint tabs 45 which protrude upward out of the upper periphery 33a of the bag body 33 to be coupled with the mounting brackets 18.

As indicated by double-dotted lines in FIG. 1, the bag body 33 is designed to unfold from the folded-up configuration and deploy over the windows W1, W2 and pillar garnishes 7 and 8 of the center pillar CP and rear pillar RP when fed with an inflation gas from the inflator 12. As shown in FIG. 4, the bag body 33 includes a gas admitting region 34 which admits an inflation gas G and is inflated in such a manner as to separate an inboard side wall 34a from an outboard side wall 34b, and a non-admitting region 39 which is so formed that the inboard side wall 34a and outboard side wall 34b are attached together and admits no inflation gas. In the illustrated embodiment, the gas admitting region 34 includes a connection port 37, a protection region 35, and a gas feed path 36 which guides the inflation gas G from the connection port 37 to the protection region 35, and the non-admitting region 39 includes a peripheral region 40, a panel region 41 and closed regions 42.

As shown in FIG. 4, the protection region 35 of the gas admitting region 34 includes a front protection region 35a deployable over the window W1 at a side of the front seat and a rear protection region 35b deployable over the window W2 at a side of the rear seat. The gas feed path 36 is disposed generally along a front and rear direction in a vicinity of the upper periphery 33a of the bag body 33 for guiding an inflation gas G fed from the inflator 12 into the protection region 35 (i.e., into the front protection region 35a and rear protection region 35b) disposed beneath the gas feed path 36. The connection port 37 of the illustrated embodiment is formed to protrude rearward out of the bag body 33 in a vicinity of the rear end of the gas feed path 36, and has an opening at the rear end for connection with the inflator 12. When the bag body 33 is fully inflated, each of the front protection region 35a and rear protection region 35b is reduced in width in a front and rear direction compared to in an uninflated state. The front protection region 35a and rear protection region 35b are provided with the closed regions 42 of the non-admitting region 39 which help limit the thicknesses of the bag body 33 as inflated and keep the bag body 33 in a board-like shape elongated in a front and rear direction.

The peripheral region 40 of the non-admitting region 39 is so formed as to enclose the gas admitting region 34 all over except the rear end of the connection port 37. The panel region 41 is disposed between the front protection region 35a and rear protection region 35b, and has a generally rectangular panel shape.

In the illustrated embodiment, the bag body 33 is formed by one-piece woven technology using polyamide yarn, polyester yarn or the like. The joint tabs 45 are prepared separate from the bag body 33.

Figure 6:
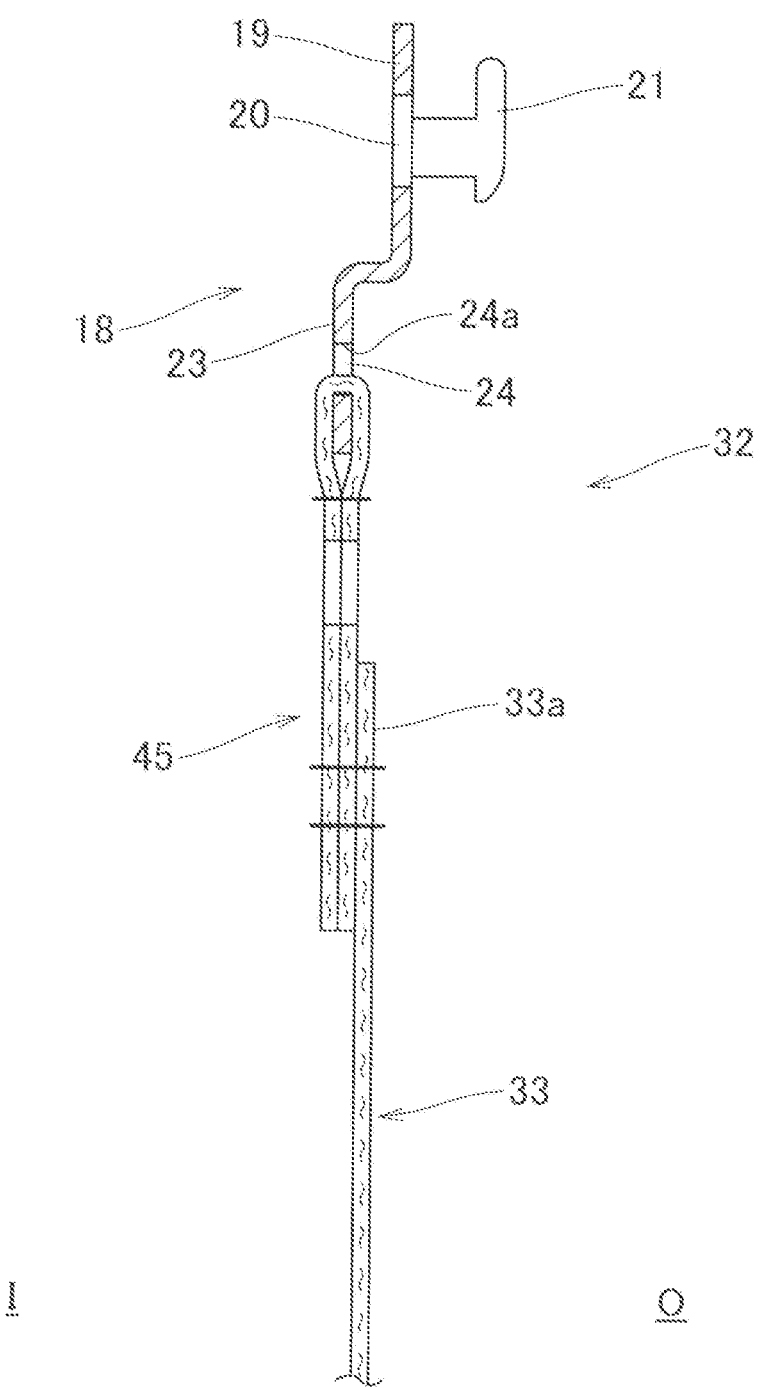
FIG. 6 is a partial enlarged sectional view taken along line VI-VI of FIG. 5.

The joint tabs 45 are used to mount the upper periphery 33a region of the bag body 33 on the inner panel 2 of the vehicle body structure 1, and are located at a plurality of (four, in the illustrated embodiment) positions of the upper periphery 33a of the bag body 33 at intervals in an upwardly protruding fashion. Each of the joint tabs 45 is formed of fabric woven by polyamide yarn, polyester yarn or the like, and has a band shape so sized in width to the joint hole 24 of each of the mounting brackets 18. Each of the joint tabs 45 is inserted through the joint hole 24 of the mounting bracket 18 and jointed (sewn) to the upper periphery 33a of the bag body 33 by both ends, as shown in FIGS. 5 and 6, thus forming a loop. That is, each of the joint tabs 45 is jointed to the bag body 33 as coupled with the mounting bracket 18.

The bag body 33 further includes a joint belt 44 which extends forward from the front end of the bag body 33 to be fixed to the vehicle body structure 1 by the front end. The joint belt 44 is prepared separate from the bag body 33, too. The joint belt 44 is configured to extend from a position slightly above the center in an up and down direction of the front end of the bag body 33 in an uninflated state, for mounting on a front pillar region of the vehicle body structure through the use of the mounting bracket 18 in a similar fashion to other joint tabs 45, as shown in FIGS. 1 and 4.

The case 50 for housing the airbag 32 in a folded-up configuration (i.e. the folded-up body 95) is formed into an elongate contour that extends in a front and rear direction and has a generally reverse U shaped sectional contour so as to cover the upper side and outboard side of the folded-up body 95 and is open at the lower side, as shown in FIG. 2. As shown in FIG. 1, in the illustrated embodiment, two cases i.e., a case 50F which houses the front protection region 35a and a case 50R which houses the rear protection region 35b, are referred to as the case 50.

Figure 9:
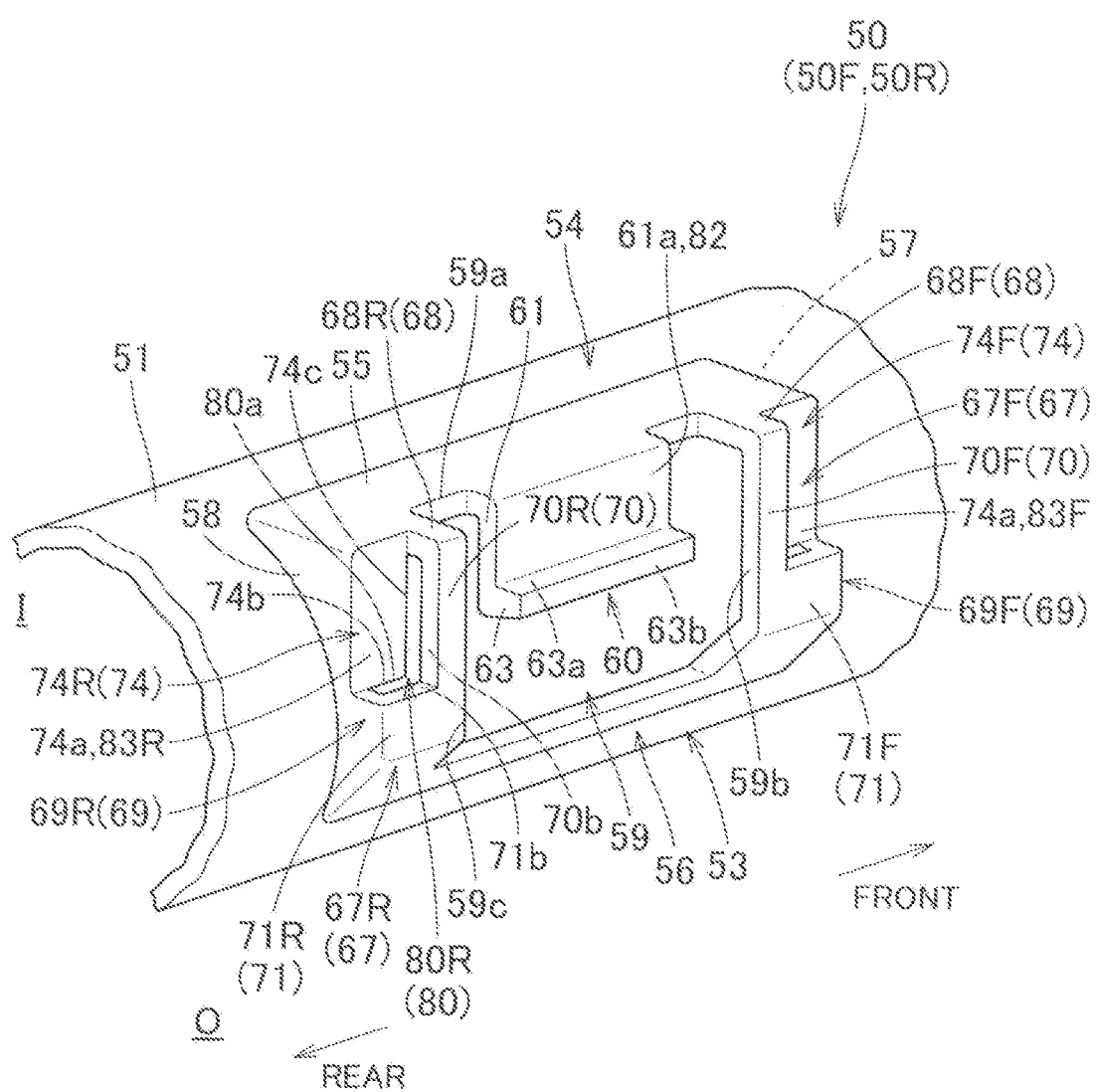
FIG. 9 is a schematic partial enlarged perspective view of a case for use in the airbag device of FIG. 1 as viewed from an outboard side.
Figure 10:
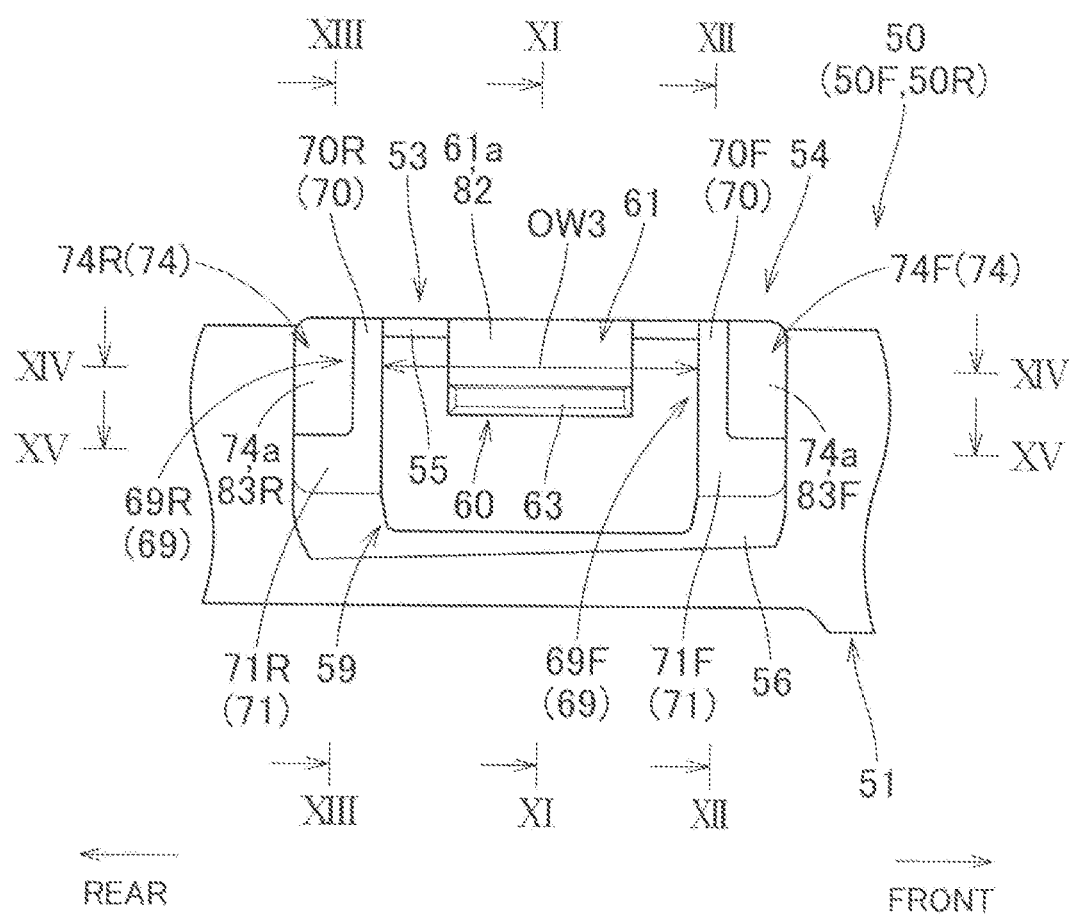
FIG. 10 is a partial enlarged rear view of the case of FIG. 9 as viewed from the outboard side.

Each of the cases 50 (50F and 50R) is fabricated of such synthetic resin as thermoplastic elastomer of polyolefin, and is designed to cover the upper side and outboard side of the folded-up body 95 as shown in FIG. 2. As shown in FIGS. 9 and 10, each of the cases 50 (50F and 50R) includes, at the regions where the mounting brackets 18 protruding out of the folded-up body 95 are located, engaging regions 53 for receiving the joint plate sections 23 of the mounting brackets 18.

As shown in FIG. 9, each of the engaging regions 53 is formed at an engaging base region 54 of the case 50 which is formed to protrude upward and towards an outboard direction out of a general region 51 of the case 50. In the illustrated embodiment, each of the engaging regions 53 is formed into a generally symmetric contour in a front and rear direction. Each of the engaging base regions 54 is formed into a generally box shape protruding out of the general region 51, and has an opening generally at the center in a front and rear direction which is formed by cutting out a portion of the box. The engaging base region 54 includes, around the cut-out opening, an upper wall region 55 which protrudes out of a vicinity of an upper surface of the general region 51 and hangs over towards an outboard direction O so as to extend generally along an inboard-outboard direction, an outboard side wall 56 which is formed in such a manner as to be raised towards an outboard direction with respect to the general region 51 and extend generally along an up and down direction, a front wall region 57 and a rear wall region 58 which extend generally along an up and down direction at the front and rear edges of the cut-out opening. As shown in FIGS. 9 to 11, 14 and 15, the cut-out opening constitutes a through opening 59 through which the mounting section 19 of the mounting bracket 18 goes through to protrude out of the case 50. In order to receive the mounting section 19 only, the opening width OW3 (FIG. 10) in a front and rear direction of the through opening 59 is greater than the width H2 in a front and rear direction of the mounting section 19 and is smaller than the width H1 in a front and rear direction of the joint plate section 23.

Figure 11:
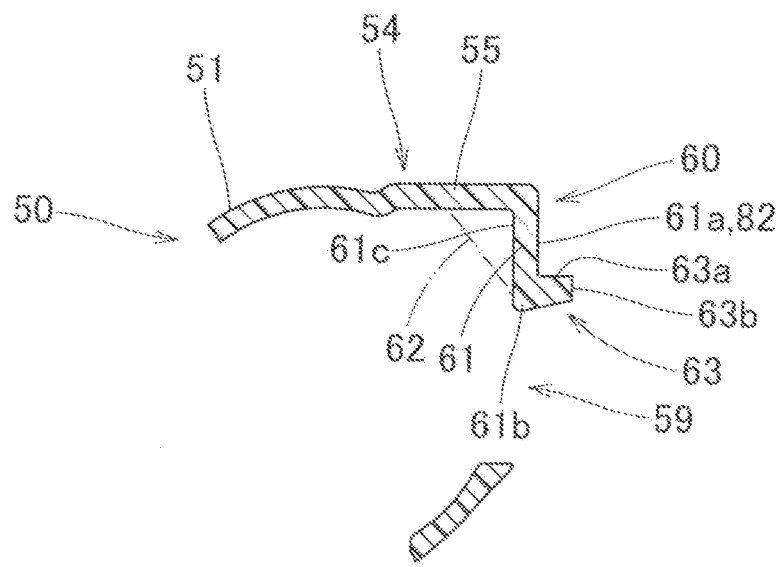
FIG. 11 is an end sectional view taken along line XI-XI of FIG. 10.
Figure 14:
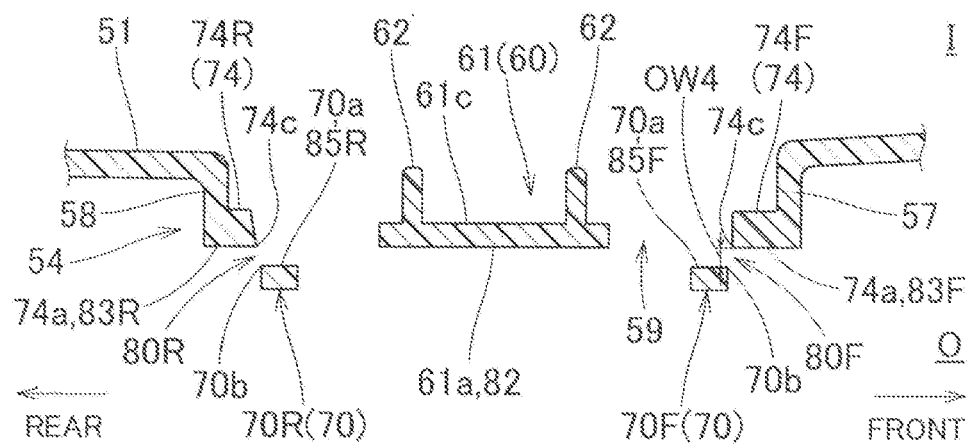
FIG. 14 is an end sectional view taken along line XIV-XIV of FIG. 10.
Figure 15:
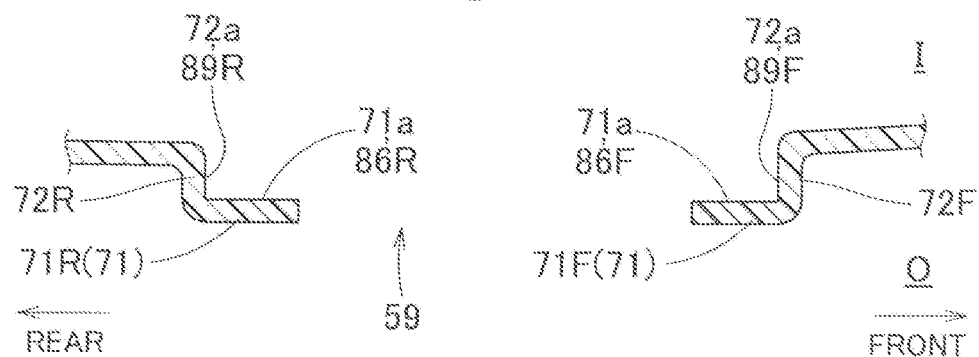
FIG. 15 is an end sectional view taken along line XV-XV of FIG. 10.

Referring to FIGS. 9 to 11, a retaining pawl 60 is provided in a vicinity of the upper edge 59a of the through opening 59 in such a manner as to be continuous with a distal end of the upper wall region 55. The retaining pawl 60 extends downward from the vicinity of the upper edge 59a of the through opening 59a generally at the center in a front and rear direction of the through opening 59a. As shown in FIG. 18, the retaining pawl 60 of the illustrated embodiment is designed to be disposed at an inboard side of the joint plate section 23 when the mounting bracket 18 and the case 50 are mated. The retaining pawl 60 includes a neck region 61 which is disposed generally along an up and down direction so as to fit the joint plate section 23, and a pawl body 63 which protrudes towards an outboard direction O out of the leading end (lower end 61b) of the neck region 61. The pawl body 63 protrudes towards an outboard direction O generally along an inboard-outboard direction and generally perpendicularly to the neck region 61, and is put into the joint hole (or retaining hole) 24 of the joint plate section 23 through which the joint tab 45 has already been put. More specifically, in this specific embodiment, the pawl body 63 is designed such that the upper surface 63a, which is engageable with the upper inner surface 24a of the joint hole 24, is generally orthogonal to an outboard side surface 61a of the neck region 61. In the illustrated embodiment, furthermore, two reinforcing ribs 62 are disposed side by side in a front and rear direction on an inboard side surface 61c of the neck region 61 in such a manner as to protrude towards an inboard direction I, as shown in FIG. 14. As indicated by double-dotted lines in FIG. 11, each of the reinforcing ribs 62 has a generally triangular contour connecting the neck region 61 and the upper wall region 55 of the engaging base region 54, as viewed from a front and rear direction. In the illustrated embodiment, the outboard side surface 61a of the neck region 61 constitutes an inboard side pressing surface which presses an inboard side surface of the joint plate section 23 when the pawl body 63 is in engagement with the joint hole 24. More specifically, the outboard side surface 61a of the neck region 61 constitutes an inboard side central pressing surface 82 which presses an inboard side of a region of the joint plate section 23 above the joint hole 24, namely, an inboard side surface 26a of an upper pressed region 26 (FIGS. 11, 14, 18 and 21).

Figure 12:
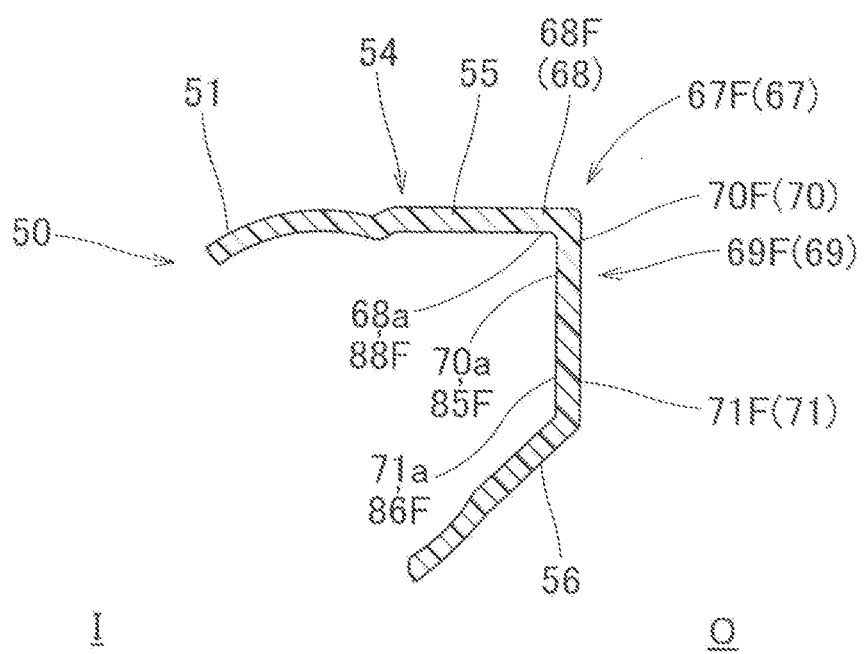
FIG. 12 is an end sectional view taken along line XII-XII of FIG. 10.

As shown in FIGS. 9 and 10, in a vicinity of each of the front edge 59b and rear edge 59c of the through opening 59, there is provided an outboard side pressing wall 67 (67F/67R) which covers an upper side and an outboard side of the joint plate section 23. As shown in FIGS. 9 and 12, each of the outboard side pressing walls 67 (67F and 67R) includes an upper region 68 (68F, 68R) which is continuous with the upper wall region 55 and protrudes towards an outboard direction O, and an outboard side region 69 (69F, 69R) which extends downward from the leading end of the upper region 68 (68F, 68R) and is connected with a lower end region of the outboard side wall 56. Each of the outboard side regions 69 (69F and 69R) includes an outer upper region 70 (70F, 70R) which is disposed on the upper side, and an outer lower region 71 (71F, 71R) which is disposed on the lower side.

In the illustrated embodiment, in each of the outboard side pressing walls 67 (67F and 67R), the upper region 68 and the outer upper region 70 of the outboard side region 69 are each formed into a band and have a generally identical width in a front and rear direction, as shown in FIG. 9. Each of the outboard side pressing walls 67 is provided with an opening, which runs through in a front and rear direction, for receiving the joint plate section 23. More particularly, as shown in FIGS. 10, 17, the outer upper region 70 (70F, 70R) extends farther downward than the retaining pawl 60, to a vicinity of the lower edge of the joint hole 24 in engagement with the retaining pawl 60.

As shown in FIGS. 9 and 10, in each of the outboard side regions 69 (69F and 69R), the outer lower region 71 is continuous with the outer upper region 70 and extends downwardly and outwardly in a front and rear direction. The outer lower region 71F includes, at the front edge, a front connecting region 72F which continues to the front wall region 57 (FIG. 15), and is continuous with the outboard side wall 56 of the engaging base region 54 by the lower end, thus covering the front edge of the lower region of the joint plate section 23. The outer lower region 71R includes, at the rear edge, a rear connecting region 72R which continues to the rear wall region 58 (FIG. 15), and is continuous with the outboard side wall 56 of the engaging base region 54 by the lower end, thus covering the rear edge of the lower region of the joint plate section 23. The outer lower regions 71 (71F and 71R) are disposed below the retaining pawl 60, as shown in FIG. 10.

Figure 19:
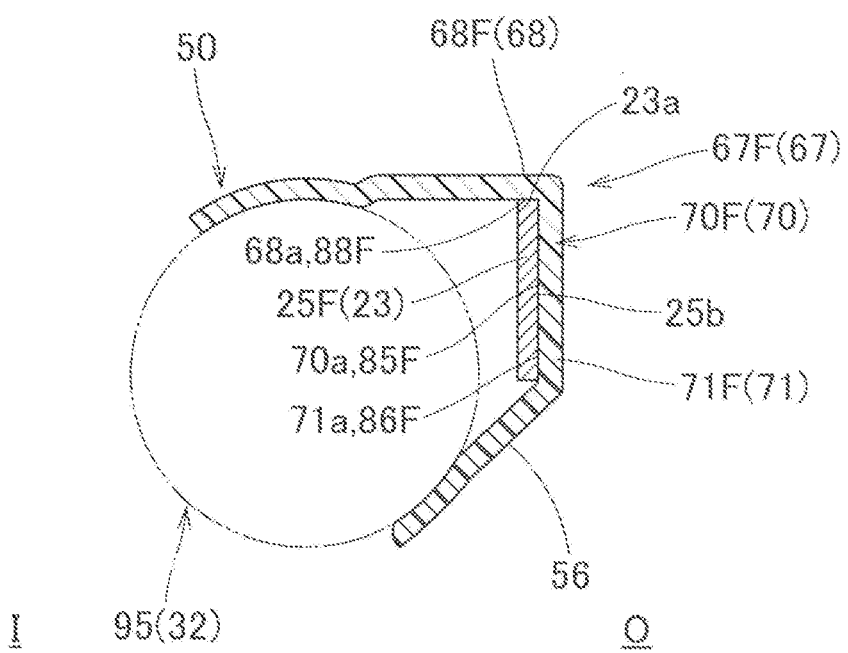
FIG. 19 is an end sectional view taken along line XIX-XIX of FIG. 17.
Figure 20:
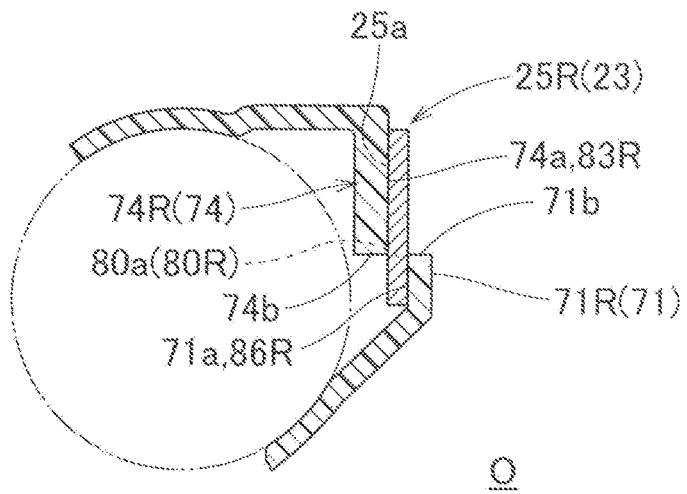
FIG. 20 is an end sectional view taken along line XX-XX of FIG. 17.
Figure 21:
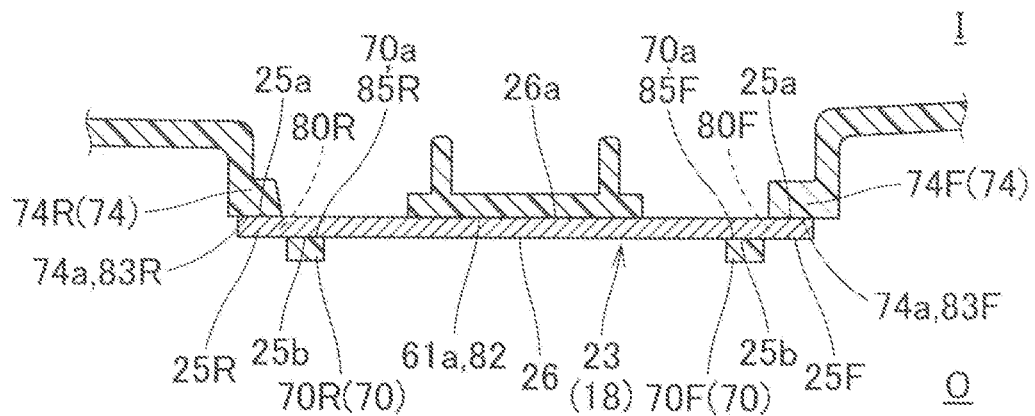
FIG. 21 is an end sectional view taken along line XXI-XXI of FIG. 17.

In the illustrated embodiment, as shown in FIGS. 12, 14, 19 and 21, the inboard side surfaces 70a of the outer upper regions 70 (70F and 70R) of the outboard side pressing walls 67 (67F and 67R) constitute the outboard side pressing surfaces 85F and 85R which press outboard sides (i.e., outboard side surfaces 25b) of the front pressed region 25F and rear pressed region 25R of the joint plate section 23, which are areas in front of and at the rear of the joint hole 24. Further, as shown in FIGS. 12, 13, 15, 19, 20 and 22, inboard side surfaces 71a of the outer lower regions 71 (71F and 71R) constitute auxiliary holding surfaces 86F and 86R which supplementarily hold outboard sides of the joint plate section 23 on the lower side of the pawl body 63 of the retaining pawl 60. That is, the auxiliary holding surfaces 86F and 86R press, in an auxiliary fashion, outboard sides (i.e., outboard side surfaces 25b) of the areas disposed below the front pressed region 25F and rear pressed region 25R of the joint plate section 23. Moreover, as shown in FIGS. 12 and 19, the lower surfaces 68a of the upper regions 68 (68F and 68R) of the outboard side pressing walls 67 (67F and 67R)

constitute upper stopper surfaces 88F and 88R which abut against the upper surface 23a of the joint plate section 23 and prevent the joint plate section 23 from being dislocated upward, and the inner surfaces 72a of the front connecting region 72F and rear connecting region 72R of the outer lower regions 71 (71F and 71R) constitute a pair of front-rear stopper surfaces 89F and 89R which abut against the front surface 23b and rear surface 23c of the joint plate section 23 and prevent the joint plate section 23 from being dislocated in a front and rear direction.

Figure 13:
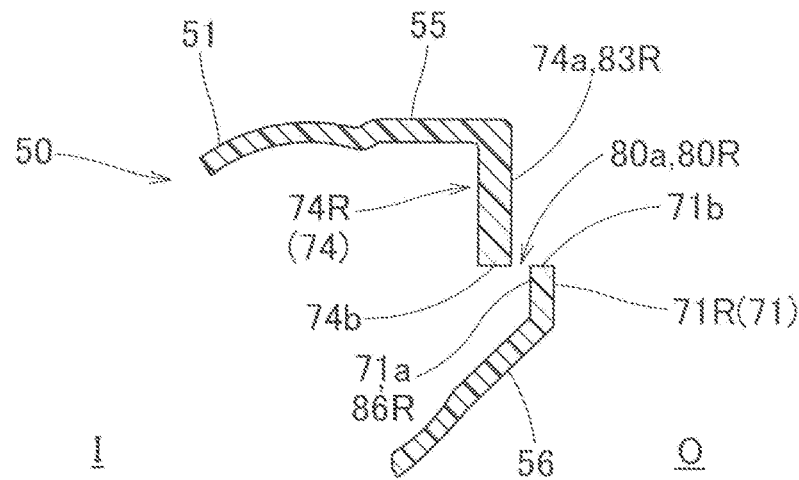
FIG. 13 is an end sectional view taken along line XIII-XIII of FIG. 10.

As shown in FIGS. 9 and 10, each of the outboard side pressing walls 67 (67F and 67R) is further provided, on the outer side in a front and rear direction of the outer upper region 70 (on a side facing away from the through opening 59), with an inboard side pressing wall 74 (74F, 74R) which covers the inboard side of the joint plate section 23. Each of the inboard side pressing walls 74 (74F and 74R) extends downward from the upper wall region 55 and is continuous with the front wall region 57/the rear wall region 58 on the outer side in a front and rear direction (FIGS. 13 and 14). Referring to FIG. 14, when the case 50 is viewed from a front and rear direction or an up and down direction, each of the inboard side pressing walls 74 (74F and 74R) is disposed at such a position as to be generally identical in an inboard-outboard direction to the neck region 61 of the retaining pawl 60, and farther towards the interior of vehicle V than the outboard side regions 69 (69F and 69R) of the outboard side pressing walls 67 (67F and 67R). If the case 50 is viewed from an inboard-outboard direction, each of the inboard side pressing walls 74 (74F and 74R) is located at a position dislocated from the outboard side pressing walls 67 (67F and 67R). In other words, as shown in FIGS. 13 and 14, the inboard side pressing walls 74 (74F and 74R) are so disposed as not to overlap with the outboard side pressing walls 67 (67F and 67R) in an inboard-outboard direction. Further, in the illustrated embodiment, each of outboard side surfaces 74a of the inboard side pressing walls 74 (74F and 74R) constitutes an inboard side edge pressing surface 83F/83R which presses an inboard side (i.e., an inboard side surface 25a) of the front pressed region 25F/rear pressed region 25R of the joint plate section 23, as shown in FIGS. 13, 14, 20 and 21.

Referring to FIGS. 9, 13 and 14, one each slot is formed in a vicinity of a boundary of the inboard side pressing wall 74 (74F, 74R), the outer upper region 70 (70F, 70R) and the outer lower region 71 (71F, 71R) of the outboard side pressing wall 67 (67F, 67R). These slots constitute the insert slots 80F and 80R which are open at the lower end region and allow the joint plate section 23 to slide upward therein. As shown in FIG. 14, the opening width OW4 of each of the insert slots 80F and 80R, in other words, a clearance between the inboard side pressing wall 74 and outboard side pressing wall 67 as viewed from a front and rear direction or an up and down direction, is slightly greater than the thickness of the joint plate section 23 so as to receive the joint palate region 23. The opening width OW4 is such that, when the joint plate section 23 is in abutting contact with either one of the inboard side pressing wall 74 or outboard side pressing wall 67, the other is disposed in proximity to the joint plate section 23. In the illustrated embodiment, an opening 80a, which is formed in a vicinity of the lower end of each of the insert slots 80F and 80R, is composed of a gap extending generally along a front and rear direction between the lower edge 74b of the inboard side pressing wall 74 (74F, 74R) and the upper edge 71b of the outer lower region 71 (71F, 71R), as shown in FIGS. 9 and 13, and each of the insert slots 80F and 80R is composed of a gap extending generally along an up and down direction between the inner edge 74c in a front and rear direction of the inboard side pressing wall 74 (74F, 74R) and the outer edge 70b (FIGS. 9 and 14) in a front and rear direction of the outer upper region 70 (70F, 70R).

Figure 16:
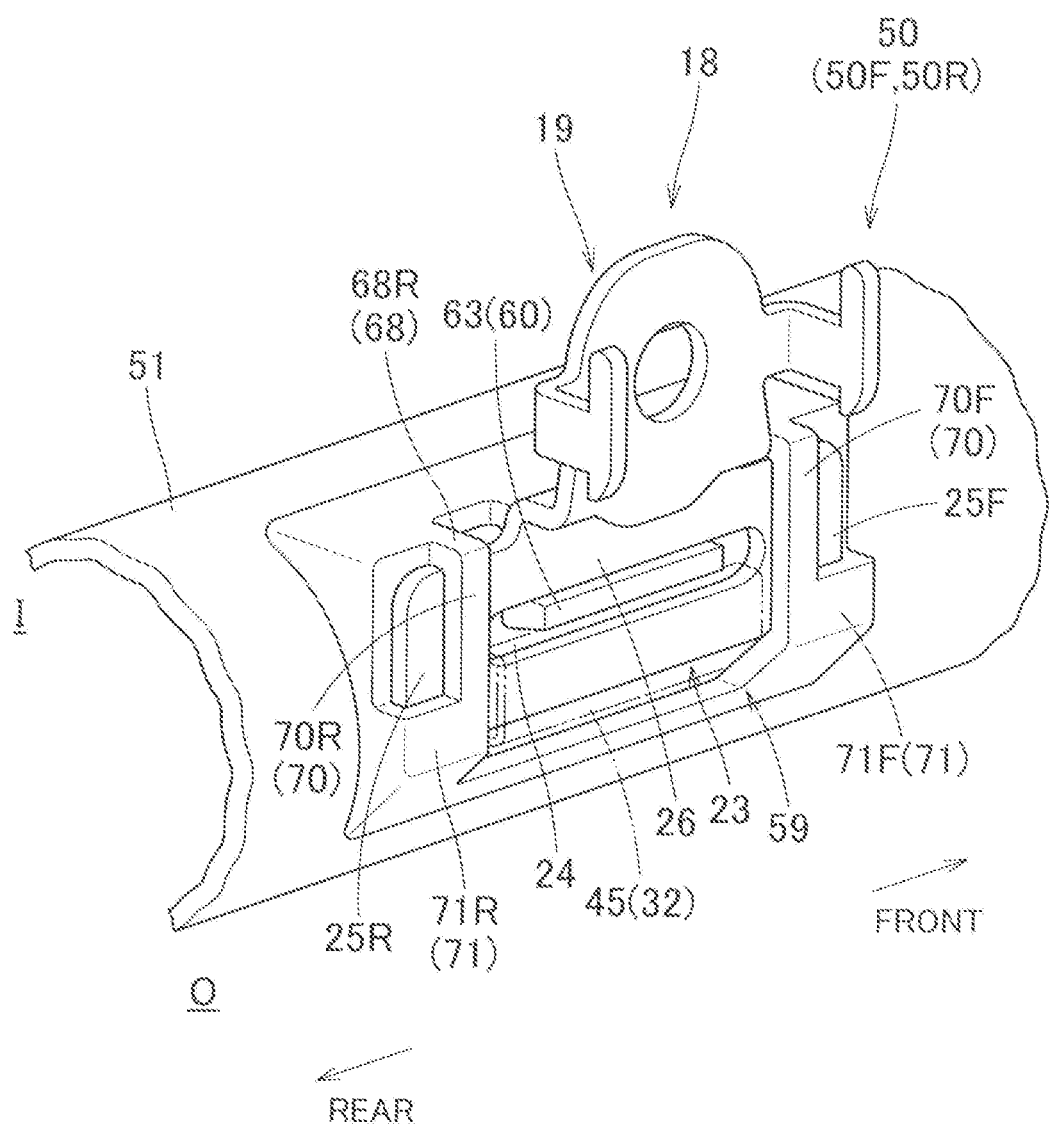
FIG. 16 is a schematic partial enlarged perspective view of the case of FIG. 9 to which the mounting bracket is coupled, as viewed from the outboard side.
Figure 22:
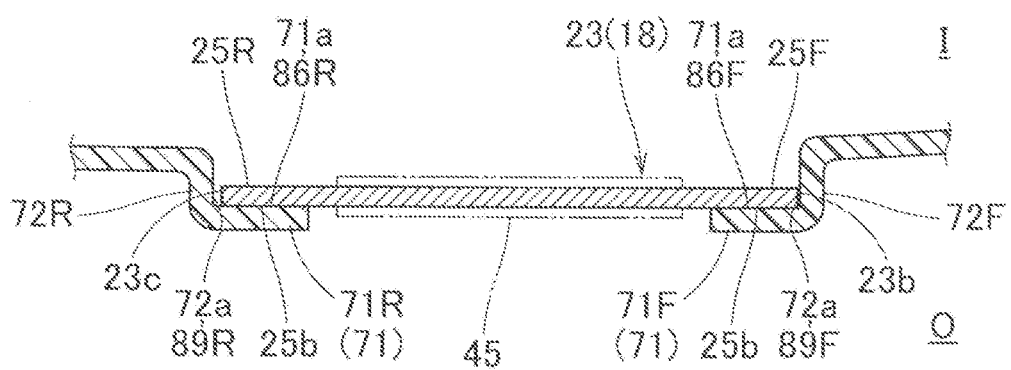
FIG. 22 is an end sectional view taken along line XXII-XXII of FIG. 17.

That is, the engaging region 53 of the case 50 of the illustrated embodiment includes the through opening 59 which allows the mounting section 19 of the mounting bracket 18 to go through, the insert slots 80F and 80R which allow the joint plate section 23 of the mounting bracket 18 to slide upward therein, the retaining pawl 60 which is disposed in the periphery of the through opening 59 and retains the joint plate section 23 having completed slide movement inside the insert slots 80F and 80R, the inboard side central pressing surface 82, the inboard side edge pressing surfaces 83F and 83R, the outboard side pressing surfaces 85F and 85R, the auxiliary holding surfaces 86F and 86R, the upper stopper surfaces 88F and 88R and the front-rear stopper surfaces 89F and 89R, which keep the joint plate section 23 retained by the retaining pawl 60 in place. As shown in FIGS. 16 and 17, when the joint plate section 23 is in engagement with the engaging region 53 of the case 50, the pawl body 63 of the retaining pawl 60 is put through the joint hole 24 of the joint plate section 23 and the joint plate section 23 is held, on the inboard side, by the inboard side edge pressing surface 83F and 83R and the inboard side central pressing surface 82, and held by the outboard side pressing surfaces 85F and 85R on the outboard side, as shown in FIGS. 18 to 22. At this time, the joint plate section 23 is also prevented from moving upward or in a front and rear direction by the upper stopper surfaces 88F and 88R and the front-rear stopper surfaces 89F and 89R, as shown in FIGS. 19 and 22.

Mounting of the head-protecting airbag device M on the vehicle V is now described. Firstly, the bag body 33 is folded up from a flattened state in which the inboard side wall 34a and outboard side wall 34b are in abutment with each other. The bag body 33 is folded up in such a manner that the dimension between the upper edge 33a and the lower edge 33b is reduced, thus formed into the folded-up body 95 which is elongated in a front and rear direction. More particularly, as shown in FIG. 2, an area of the gas feed path 36, which is in a vicinity of the upper edge 33a of the bag body 33, is folded in a bellows fashion on a plurality of creases extending along a front and rear direction, and the protection region 35 disposed below the gas feed path 36 is rolled from the lower edge 33b on the outboard side wall 34b. Then not-shown breakable wrapping members are wrapped around the folded-up body 95 at predetermined positions for keeping the folded-up configuration.

Figure 23:
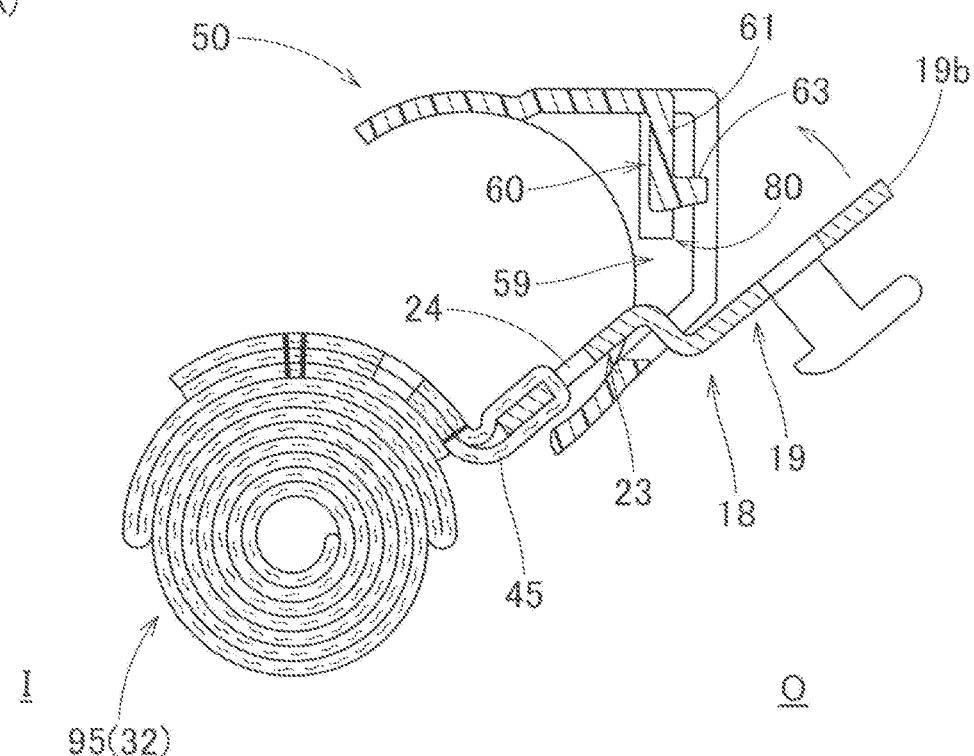
FIG. 23 and FIG. 24 are vertical sectional views illustrating the process of coupling the mounting bracket to the case of FIG. 9 and housing the airbag in the case.
Figure 23:
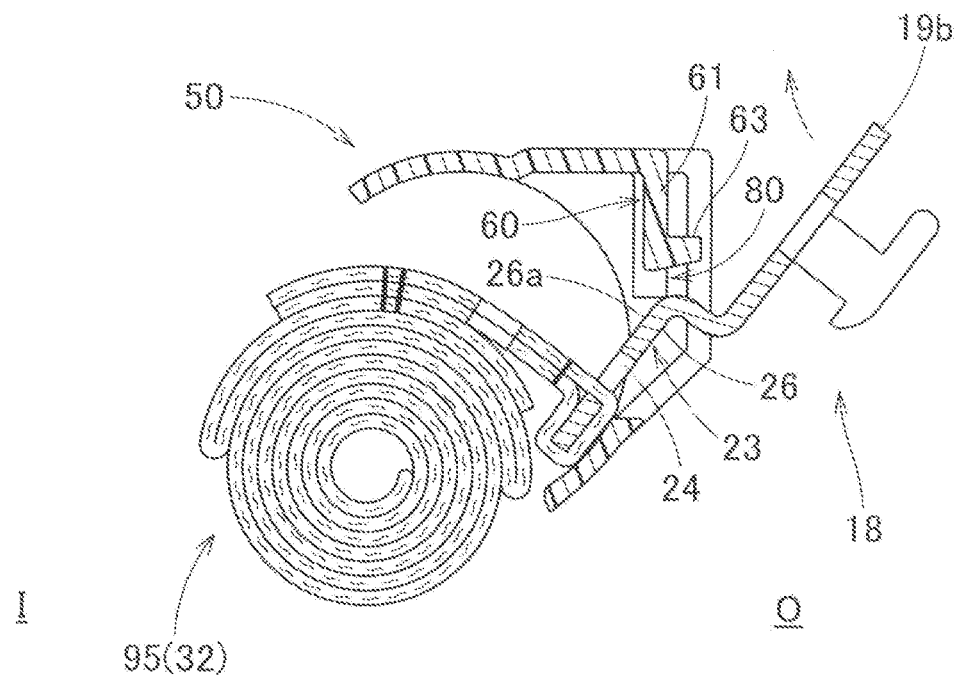

Subsequently, the joint tabs 45, each of which has been put through the joint hole 24 of the mounting bracket 18 in advance, are sewn to the upper edge 33a of the bag body 33 with sewing threads. Then the folded-up body 95 is stored inside the cases 50 from below. More specifically, as shown in (A) of FIG. 23, with the upper end 19b pointed towards an outboard direction O, the mounting section 19 of each of the mounting brackets 18 is put through the through opening 59 of each of the engaging base regions 54 of the case 50 with the upper end 19b at the head. When the mounting section 19 has gone through the through opening 59 and protrudes out of the case 50, as shown in (B) of FIG. 23 and (A) of FIG. 24, the upper end 19b of the mounting section 19 of each of the mounting brackets 18 is pulled up towards an inboard direction I such that the joint plate section 23 goes into the insert slots 80F and 80R via the openings 80a and slides upward therein. At this time, as shown in (A) of FIG. 24, the neck region 61 of the retaining pawl 60 is bent and the leading end 63b of the pawl body 63 abuts against the inboard side surface 26a of the upper pressed region 26 of the joint plate section 23. If then the joint plate section 23 is further moved upward until the joint hole 24 reaches the position of the pawl body 63 of the retaining pawl 60, the neck region 61 restores to the original straight shape and the pawl body 63 goes into the joint hole 24 as shown in (B) of FIG. 24, such that the pawl body 63 is retained by the periphery of the joint hole 24 and the joint plate section 23 is put into engagement with the engaging region 53. If the joint plate sections 23 of the mounting brackets 18 are put into engagement with the engaging regions 53 of the case 50 this way, the folded-up body 95 is housed in the case 50 with the mounting brackets 18 coupled to the case 50. Then if the mounting bracket 14 is mounted on the inflator 12 and the inflator 12 is connected with the connection port 37 of the bag body 33 with the aid of the clamp 13, an airbag module is formed.

Subsequently, the mounting brackets 14 and 18 are located at predetermined positions on the inner panel 2 and secured thereto with the bolts 15 and 28. Then not-shown lead wires extending from a suitable control for actuating the inflator is connected to the inflator 12. If then the front pillar garnish 4, the roof head liner 5 and the pillar garnishes 6 and 7 are mounted on the inner panel 2, the head-protecting airbag device M is mounted on the vehicle V.

After the airbag device M is mounted on the vehicle V, when the inflator 12 is actuated in response to an actuating signal fed from the control, an inflation gas is discharged from the inflator 12 and flows into and inflates the bag body 33, and the bag body 33 then pushes and opens the airbag cover 9 while breaking the wrapping member and is deployed downward on the inboard side of the windows W1, W2, the center pillar CP, and the rear pillar RP.

With the configuration of the head-protecting airbag device M of the foregoing embodiment, if, when the folded-up body 95 is housed inside the case 50, the joint plate section 23 of each of mounting brackets 18 is inserted into the insert slots 80F and 80R of each of the engaging regions 53 of the case 50 and slid therein generally in an up and down direction, the retaining pawl 60 of each of the engaging regions 53 is inserted into the joint hole (retaining hole) 24 of each of the joint plate sections 23 and is retained by the periphery (specifically, by the upper inner surface 24a) of the joint hole 24. That is, in the head-protecting airbag device M, the coupling work of the joint plate section 23 of the mounting bracket 18 and engaging region 53 of the case 50 can be easily done merely by inserting the joint plate section 23 into the insert slots 80F and 80R of the engaging region 53 and sliding it therein generally along an up and down direction, which will facilitate the storing of the folded-up body 95, which is elongated and has numerous mounting brackets 18, in the cases 50 (50F and 50R).

Moreover, in the head-protecting airbag device M, when the retaining pawl 60 is in engagement with the joint hole 24, the joint plate section 23 is pressed, on the inboard side and outboard side, by the inboard side pressing surfaces (specifically, by the inboard side central pressing surface 82 and inboard side edge pressing surfaces 83F and 83R) and outboard side pressing surfaces 85F and 85R, thus limited from moving in an inboard-outboard direction. Additionally, since the pawl body 63 of each of the retaining pawls 60 is retained by the periphery (or the upper inner surface 24a) of each of the joint holes 24, the joint plate section 23 is prevented from moving considerably in an up and down direction as well. That is, the mounting brackets 18 are securely kept in place and prevented from being dislocated with respect to the case 50.

Therefore, with the head-protecting airbag device M of the foregoing embodiment, the joint plate sections 23 of the mounting brackets 18 are easily coupled with the case 50 without a fear of dislocation of the mounting brackets 18 with respect to the case 50 thereafter.

In the head-protecting airbag device M of the foregoing embodiment, each of the retaining pawls 60 includes the neck region 61 which is disposed generally along an up and down direction and the pawl body 63 which protrudes out of the leading end (lower end 61b) of the neck region 61 towards an outboard direction O, and the outboard side surface 61a of the neck region 61 (i.e. the surface of the neck region 61 facing towards the joint plate section 23) constitutes the inboard side pressing surface (the inboard side central pressing surface 82). With this configuration, when the joint plate section 23 is slid through the insert slots 80F and 80R, the neck region 61 bends, and due to this bend, the pawl body 63 presses the joint plate section 23 towards the outboard side pressing surfaces 85F and 85R which are opposed to the pawl body 63. Accordingly, the joint plate section 23 is moved in an up and down direction without a shakiness, in a stable fashion. Moreover, when the slide movement of the joint plate section 23 is completed and the joint hole (retaining hole) 24 reaches the position of the pawl body 63 of the retaining pawl 60, the neck region 61 restores to the original straight shape and presses the joint plate section 23 with the outboard side surface 61a (i.e. with the surface facing towards the joint plate section 23), and the pawl body 63 goes into the joint hole 24 automatically and retains the joint plate section 23. Therefore, the coupling work of the joint plate section 23 with the engaging region 53 is easy. If such an advantageous effect does not have to be considered, the retaining pawl may be configured in a different fashion, without a neck region disposed along the joint plate section. By way of example, it is conceivable to configure the retaining pawl generally orthogonal to the joint plate section such that a pawl body formed at the leading end is inserted into the retaining hole, and to provide an inboard side pressing surface and an outboard side pressing surface separately.

Moreover, in addition to the inboard side pressing surface (inboard side central pressing surface) 82 composed of the outboard side surface 61a of the neck region 61 of the retaining pawl 60, the head-protecting airbag device M includes, in the engaging region 63 of the case 50, additional inboard side pressing surfaces (i.e., inboard side edge pressing surfaces) 83F and 83R at positions distant from the retaining pawl 60 in a front and rear direction and on a side the pawl body 63 is protruding. With this configuration, when the joint plate section 23 is moved inside the insert slots 80F and 80R, even while the neck region 61 is bent, the joint plate section 23 is smoothly guided by the inboard side edge pressing surfaces 83F and 83R and the outboard side pressing surfaces 85F and 85R which are opposed to the surfaces 83F and 83R. Therefore, the joint plate section 23 is moved in an up and down direction without a shakiness, in a further stable fashion. If such an advantageous effect does not have to be considered, the engaging region may be configured with only one inboard side pressing surface composed of the outboard side surface of the neck region of the retaining pawl.

In the head-protecting airbag device M of the foregoing embodiment, especially, the insert slots 80F and 80R are composed of a gap formed between the inboard side edge pressing surfaces 83F and 83R and outboard side pressing surfaces 85F and 85R which press the inboard side and outboard side of the joint plate section 23 in engagement with the retaining pawl 60. The insert slots 80F and 80R are dislocated from the retaining pawl 60 in a front and rear direction. That is, although the opening width OW4 of the insert slots 80F and 80R is set so small as to receive only the joint plate section 23, this configuration will allow a smooth bending of the retaining pawl 60 at inserting the joint plate section 23 into the slots 80F and 80R, and the pawl body 63 will be smoothly inserted into the joint hole 24 when the slide movement is completed and the neck region 61 restores to the straight shape, and the inboard side edge pressing surfaces 83F and 83R and the outboard side pressing surfaces 85F and 85R immediately press the inboard side and outboard side of the joint plat section 23. Therefore, the coupling work of the joint plate section 23 with the engaging region 53 is easy.

In the head-protecting airbag device M, furthermore, the pawl body 63 protrudes out of the lower end 61b of the neck region 61 towards an outboard direction O, and the engaging region 53 includes, on the outboard side of a region of the joint plate section 23 disposed below the pawl body 63, the auxiliary holding surfaces 86F and 86R which supplementarily hold the outboard side of the joint plate section 23. This configuration will help keep the engagement between the retaining pawl 60 and the joint plate section 23 even if such a force that acts to disengage the pawl body 63 of the retaining pawl 60 from the periphery of the joint hole 24 is applied to a vicinity of the pawl body 63 before the airbag device M is mounted on the vehicle V. That is, the auxiliary holding surfaces 86F and 86R will prevent the region of the joint plate section 23 below the joint hole 24 (specifically, the regions below the front pressed region 25F and the rear pressed region 25R) from moving towards an outboard direction O, and resist the force acting to disengage the retaining pawl 60 from the joint plate section 23. If such an advantageous effect does not have to be considered, the engaging region of the case may be configured such that the retaining pawl is disposed on an outboard side of the joint plate section and no auxiliary holding surface is disposed.

Although the airbag device M of the foregoing embodiment is configured such that the inboard side central pressing surface 82, the inboard side edge pressing surfaces 83F and 83R, the outboard side pressing surfaces 85F and 85R and the auxiliary holding surfaces 86F and 86R hold the joint plate section 23 on the inboard side and outboard side, these pressing or holding surfaces 82, 83F, 83R, 85F, 85R, 86F and 86R are so disposed as not to overlap in a front and rear direction of the case 50, and therefore will not be an obstacle in an insertion of the joint plate section 23 into the insert slots 80F and 80R.

Moreover, the engaging region 53 further includes the upper stopper surfaces 88F and 88R which abut against the upper surface 23a of the joint plate section 23 and prevent the joint plate section 23 from being dislocated upward. Therefore, the joint plate section 23 will be prevented from being dislocated upward with respect to the case 50. If such an advantageous effect does not have to be considered, the engaging region may be configured to prevent an upward dislocation of the joint plate section only with the insertion of the retaining pawl into the retaining hole, without an upper stopper surface.

In the airbag device M, the engaging region 53 further includes a pair of front-rear stopper surfaces 89F and 89R which abut against the front surface 23b and rear surface 23c of the joint plate section 23 and prevent the joint plate section 23 from being dislocated in a front and rear direction. Therefore, the joint plate section 23 as coupled with the case 50 will be kept from moving in a front and rear direction, in addition to in an inboard-outboard direction and an up and down direction, and the mounting bracket 18 will be adequately kept in place with respect to the case 50. If such an advantageous effect does not have to be considered, the engaging region may be configured to prevent a dislocation of the joint plate section in a front and rear direction only with the insertion of the retaining pawl into the retaining hole, without a front-rear stopper surface.

In the illustrated embodiment, a downward dislocation of the mounting bracket 18 with respect to the case 50 is prevented only with the insertion of the retaining pawl into the retaining hole 24. However, since the folded-up body 95 is disposed beneath the mounting bracket 18 (i.e., beneath the joint plate section 23) inside the case 50, the folded-up body 95 will contribute to keep the mounting bracket 18 from being dislocated downward. Therefore, the downward dislocation of the mounting bracket 18 will be adequately prevented only with the pawl body 63.

In the illustrated embodiment, furthermore, the mounting bracket 18 is coupled with the case 50 by the insertion of the retaining pawl 60 of the case 50 into the retaining hole 24 of the joint plate section 23, and the retaining hole 24 also serves as the joint hole which the joint tab 24 extending from the bag body 33 is put through for coupling of the joint tab 24 and mounting bracket 18. This configuration will save a cost and time for forming a separate retaining hole for receiving the retaining pawl 60 of the case 50. However, the configuration of the mounting bracket should not be limited thereby. By way of example, the mounting bracket may be configured of a pair of plates to be applied to both sides of a mounting tab extending from the airbag and fastened with each other, provided with a separate joint plate section.

In the illustrated embodiment, the mounting bracket 18 and engaging region 53 of the case 50 are configured such that the joint plate section 23 is slid upward inside the insert slots 80F and 80R to put the pawl body 63, which protrudes towards an outboard direction, into the joint hole 24. However, the direction in which the joint plate section is moved and the location of the retaining pawl should not be limited thereby. By way of example, it is conceivable to form the joint plate section to be mounted around the case to be slid downwardly while elongating the joint tab. The retaining pawl may also be configured to be disposed on an outboard side of the joint plate section with a pawl body protruding towards an inboard direction.

What is claimed is:

1. A head-protecting airbag device mountable on an upper periphery of a window of a vehicle inside the vehicle, the airbag device comprising:
   an airbag that is deployable over the window, the airbag being folded up in such a manner that a dimension between an upper edge and a lower edge of the airbag as deployed is reduced;
   a mounting bracket that is disposed at a vicinity of the upper edge of the airbag and is used to mount the airbag on the upper periphery of the window of a body structure of the vehicle, the mounting bracket including a mounting section to be secured to the body structure of the vehicle and a joint plate section that is disposed at a root region of the mounting section; and
   a case for housing the airbag such that the mounting section of the mounting bracket as disposed on the airbag protrudes out of the case, the case being fabricated from synthetic resin and comprising an opening for receiving the airbag at least at a lower region thereof; and an engaging region which is engageable with the joint plate section of the mounting bracket; wherein:

the joint plate section is formed generally into a plate extending generally along an up and down direction and includes a retaining hole; and the engaging region of the case comprises:
- an insert slot that allows the joint plate section to slide therein generally in the up and down direction when the airbag is housed in the case;
- a retaining pawl that protrudes generally in an inboard-outboard direction to be inserted into the retaining hole of the joint plate section and retains the joint plate section and prevents the joint plate section from being dislocated in the up and down direction; and
- an inboard side pressing surface and an outboard side pressing surface that press the joint plate section on the inboard and outboard sides and prevent the joint plate section retained by the retaining pawl from being dislocated in the inboard-outboard direction.

2. The head-protecting airbag device of claim 1, wherein:
the retaining pawl includes a neck region that is disposed generally along the up and down direction and a pawl body that protrudes out of a leading end of the neck region generally in the inboard-outboard direction and is inserted into the retaining hole and retains the joint plate section; and
a surface of the neck region facing towards the joint plate section constitutes the inboard side pressing surface or the outboard side pressing surface.

3. The head-protecting airbag device of claim 2, wherein, in addition to the inboard side pressing surface or the outboard side pressing surface composed of the surface of the neck region, the engaging region of the case comprises an additional inboard side pressing surface or outboard side pressing surface at a position distant from the retaining pawl in a front and rear direction and on a side the pawl body is protruding.

4. The head-protecting airbag device of claim 3, wherein:
the pawl body protrudes out of the lower end of the neck region towards an outboard direction;
the insert slot is configured to receive the joint plate section from a lower side thereof such that the joint plate on is slid upward therein; and
the engaging region further comprises, on an outboard side of a region of the joint plate section disposed below the pawl body; an auxiliary holding surface that supplementarily holds the outboard side of the joint plate section.

5. The head-protecting airbag device of claim 2, wherein:
the pawl body protrudes out of the lower end of the neck region towards an outboard direction;
the insert slot is configured to receive the joint plate section from a lower side thereof such that the joint plate section is slid upward therein; and
the engaging region further comprises, on an outboard side of a region of the joint plate section disposed below the pawl body, an auxiliary holding surface that supplementarily holds the outboard side of the joint plate section.

6. The head-protecting airbag device of claim 5, wherein the engaging region further comprises an upper stopper surface that abuts against an upper surface of the joint plate section and prevents the joint plate section from being dislocated upward.

7. The head-protecting airbag device of claim 1, wherein the engaging region further comprises a pair of front-rear stopper surfaces that abut against a front surface and a rear surface of the joint plate section and prevent the joint plate section from being dislocated in a front and rear direction.

8. The head-protecting airbag device of claim 1, wherein:
the airbag comprises a bag body and a joint tab that is formed into a loop out of a flexible material and protrudes upward out of an upper edge of the bag body for coupling with the mounting bracket; and
the joint tab is coupled with the mounting bracket by being inserted through the retaining hole of the mounting bracket.

\* \* \* \* \*